United States Patent
Huang et al.

(10) Patent No.: US 12,517,951 B1
(45) Date of Patent: Jan. 6, 2026

(54) SYSTEMS AND METHODS FOR COMMUNICATING VEHICLE-RELATED IMAGE DATA

(71) Applicant: Geotab Inc., Oakville (CA)

(72) Inventors: Xiaowei Huang, Markham (CA); Shanning Liu, Toronto (CA); Wenyang Liu, Richmond Hill (CA); Zhiyong Liu, Richmond Hill (CA); Jessica Mary Surya, North York (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/200,229

(22) Filed: May 6, 2025

Related U.S. Application Data

(60) Provisional application No. 63/779,624, filed on Mar. 28, 2025.

(51) Int. Cl.
*G06F 16/738* (2019.01)
*G06F 16/51* (2019.01)
*G06F 16/58* (2019.01)
*G07C 5/00* (2006.01)

(52) U.S. Cl.
CPC ............ *G06F 16/739* (2019.01); *G06F 16/51* (2019.01); *G06F 16/5866* (2019.01); *G07C 5/008* (2013.01)

(58) Field of Classification Search
None
See application file for complete search history.

(56) References Cited

U.S. PATENT DOCUMENTS

| | | | |
|---|---|---|---|
| 10,015,462 B1 | 7/2018 | Quach | |
| 11,863,712 B1 | 1/2024 | Young et al. | |
| 2013/0086109 A1* | 4/2013 | Huang | G06F 16/487 707/E17.014 |
| 2015/0032580 A1* | 1/2015 | Altermatt | H04N 7/181 705/28 |
| 2015/0287130 A1* | 10/2015 | Vercollone | G06V 10/235 705/34 |
| 2018/0293817 A1* | 10/2018 | Grunzinger, Jr. | G01M 17/00 |
| 2025/0292586 A1* | 9/2025 | Koike | G06F 16/7867 |

* cited by examiner

*Primary Examiner* — Giuseppi Giuliani
(74) *Attorney, Agent, or Firm* — Mark J. Pringle-Rigby

(57) ABSTRACT

Image data captured at vehicles is transmitted and stored remotely from vehicles. To prevent redundant transmission and storage of image data, a reference metadata database is implemented, where metadata is stored corresponding to image data. Before transmitting image data from a vehicle and storing the image data remotely, metadata corresponding to the image data is evaluated against the reference metadata database to determine whether the image data is already stored remotely from the vehicle. Where the metadata corresponding to the image data is already in the reference metadata database, the image data is not retransmitted or stored in duplicate. Where the metadata corresponding to the image data is not already in the reference metadata database, the image data is transmitted from the vehicle and stored in the image data database.

20 Claims, 8 Drawing Sheets

SYSTEMS AND METHODS FOR COMMUNICATING VEHICLE-RELATED IMAGE DATA

This application claims priority to U.S. Provisional Patent Application No. 63/779,624, titled "Systems, Devices, and Methods for Communicating Vehicle-Related Image Data", filed on Mar. 28, 2025.

TECHNICAL FIELD

The present disclosure generally relates to systems, devices, and methods for managing image data, and in particular relates to storing and transmitting image data amongst vehicle-related devices.

BACKGROUND

Image capture devices can be positioned at vehicles. Such image capture devices capture image data, which can be provided to a management server, remote device, or network device. However, image data is typically large in size, and requires significant transmission bandwidth to communicate, and occupies significant storage space. It is desirable to provide a means for optimizing efficiency of how image data is communicated from a vehicle and how image data is stored.

SUMMARY

According a broad aspect, the present disclosure describes a method comprising: storing, by a first at least one non-transitory processor-readable storage medium positioned at a vehicle, a plurality of image data segments captured by at least one image capture device positioned at the vehicle, each image data segment of the plurality of image data segments having a respective start time and a respective end time; transmitting, by at least one communication interface at the vehicle, a plurality of metadata segments associated with the plurality of image data segments, each metadata segment of the plurality of metadata segments indicating at least the respective start time and the respective end time of a corresponding image data segment of the plurality of image data segments; receiving, by a communication interface of a remote device separate from the vehicle, the plurality of metadata segments; accessing a library of reference metadata segments stored in a reference metadata storage portion of a second at least one non-transitory processor-readable storage medium of the remote device, each reference metadata segment in the library of reference metadata segments indicating at least a respective start time and a respective end time of a corresponding image data segment of a library of image data segments stored in an image data storage portion of the second at least one non-transitory processor-readable storage medium; determining, by at least one processor of the remote device for each metadata segment of the plurality of metadata segments, whether metadata criteria are satisfied, the metadata criteria comprising: the respective start time and end time indicated in the metadata segment of the plurality of metadata segments matching a start time and end time of a reference metadata segment of the library of reference metadata segments stored in the reference metadata storage portion; for each metadata segment of the plurality of metadata segments for which the metadata criteria are satisfied: outputting an indication that a corresponding image data segment is stored in the image data storage portion; and for each metadata segment of the plurality of metadata segments for which the metadata criteria are not satisfied: transmitting, by the communication interface of the remote device to be received by the at least one communication interface at the vehicle, at least one request for each image data segment of the plurality of image data segments corresponding to each metadata segment for which the metadata criteria are not satisfied; transmitting, by the at least one communication interface at the vehicle to be received by the communication interface of the remote device, each image data segment of the plurality of image data segments indicated in the at least one request; storing, by the second at least one non-transitory processor-readable storage medium in the image data storage portion, each image data segment received by the communication interface of the remote device; and storing, by the second at least one non-transitory processor-readable storage medium in the reference metadata storage portion, each metadata segment of the plurality of metadata segments corresponding to each image data segment received by the communication interface of the remote device.

The method may further comprise: capturing, by the at least one image capture device positioned at the vehicle, the plurality of image data segments; and generating the plurality of metadata segments associated with the plurality of image data segments. Transmitting the plurality of metadata segments may be performed in response to generating the plurality of metadata segments.

Transmitting the plurality of metadata segments may be performed in according with a schedule.

The at least one communication interface at the vehicle may comprise a communication interface included in the image capture device at the vehicle; transmitting the plurality of metadata segments may comprise transmitting, by the communication interface of the image capture device, the plurality of metadata segments; transmitting the at least one request for each image data segment of the plurality of image data segments corresponding to each metadata segment for which the metadata criteria are not satisfied may comprise transmitting, by the communication interface of the remote device to be received by the communication interface included in the image capture device, the at least one request; and transmitting each image data segment of the plurality of image data segments indicated in the at least one request may comprise transmitting each image data segment of the plurality of image data segments indicated in the at least one request by the communication interface of the image capture device.

The communication interface of the remote device may include a first communication interface. The at least one communication interface at the vehicle may include: a second communication interface included in a peripheral device positioned at the vehicle; a third communication interface included in the peripheral device; a fourth communication interface included in the image capture device positioned at the vehicle; and a fifth communication interface included in the image capture device. Transmitting the at least one request for each image data segment of the plurality of image data segments corresponding to each metadata segment for which the metadata criteria are not satisfied may comprise: transmitting the request by the first communication interface, to be received by the third communication interface; and transmitting the request by the second communication interface to be received by the fourth communication interface. Transmitting each image data segment of the plurality of image data segments indicated in the at least one request may comprise: transmitting each image data segment of the plurality of image data segments indicated in the at least one request by the fifth communication interface to be received by the first communication interface. Transmitting the plurality of metadata segments associated with the plurality of image data segments may comprise: transmitting the plurality of metadata segments associated with the plurality of image data segments by the fourth communication interface of the image capture device to be received by the second communication interface of the peripheral device; and transmitting the plurality of metadata segments associated with the plurality of image data segments by the third communication interface of the peripheral device. Advantageously, transmitting metadata (low volume data) via the fourth, second, and third communication interfaces makes use of communication hardware of the peripheral device, and transmitting image data (high-volume data) via the fifth communication module allows appropriate communication hardware to be used according to the volume of data being transmitted.

Each metadata segment of the plurality of metadata segments may further indicate a respective location associated with a corresponding image data segment of the plurality of image data segments; the reference metadata storage portion may further store respective location metadata associated with image data stored in the image data storage portion; and the metadata criteria may further comprise the respective location indicated in the respective metadata segment of the plurality of metadata segments matching respective location metadata stored in the reference metadata storage portion.

The first at least one non-transitory processor-readable storage medium may be included in the image capture device at the vehicle; and storing, by the first at least one non-transitory processor-readable storage medium, the plurality of image data segments may comprise storing the plurality of image data segments by the first at least one non-transitory processor-readable storage medium of the image capture device.

The method may further comprise: receiving, by a user input interface of the remote device, a user input requesting at least one select image data segment, each select image data segment having an associated start time and an associated end time; for each select image data segment where the associated start time and the associated end time match a paired start time and end time in the metadata storage portion, output the select image data segment as stored in the image data storage portion; and for each select image data segment where the associated start time and the associated end time do not match a paired start time and end time in the metadata storage portion: transmitting, by the communication interface of the remote device for reception by the at least one communication interface positioned at the vehicle, a request for the select image data segment; transmitting, by the at least one communication interface positioned at the vehicle for reception by the communication interface of the remote device, the select image data segment in response to the request for the select image data segment; and store the select image data segment as received by the remote device.

According to another broad aspect, the present disclosure describes a system comprising: at least one vehicle device for use at a vehicle, the at least one vehicle device including at least one communication interface, a first at least one processor, and a first at least one non-transitory processor-readable storage medium storing first processor-executable instructions which, when executed by the first at least one processor cause the vehicle device to: store, by the first at least one non-transitory processor-readable storage medium, a plurality of image data segments captured by an image capture device positioned at the vehicle, each image data segment of the plurality of image data segments having a respective start time and a respective end time; and transmit, by the at least one communication interface at the vehicle, a plurality of metadata segments associated with the plurality of image data segments, each metadata segment of the plurality of metadata segments indicating at least the respective start time and the respective end time of a corresponding image data segment of the plurality of image data segments; and a remote device separate from the vehicle, the remote device including at least one communication interface, a second at least one processor, and a second at least one non-transitory processor-readable storage medium storing second processor-executable instructions which, when executed by the second at least one processor cause the remote device to: receive, by the communication interface of the remote device, the plurality of metadata segments; accessing a library of reference metadata segments stored in a reference metadata storage portion of the second at least one non-transitory processor-readable storage medium, each reference metadata segment in the library of reference metadata segments indicating at least a respective start time and a respective end time of a corresponding image data segment of a library of image data segments stored in an image data storage portion of the second at least one non-transitory processor-readable storage medium; determining, by the second at least one processor for each metadata segment of the plurality of metadata segments, whether metadata criteria are satisfied, the metadata criteria comprising: the respective start time and end time indicated in the metadata segment of the plurality of metadata segments matching a start time and end time of a reference metadata segment of the library of reference metadata segments stored in the reference metadata storage portion; for each metadata segment of the plurality of metadata segments for which the metadata criteria are satisfied: output an indication that a corresponding image data segment is stored in the image data storage portion; and for each metadata segment of the plurality of metadata segments for which the metadata criteria are not satisfied: transmit, by the communication interface of the remote device to be received by the at least one communication interface at the vehicle, at least one request for each image data segment of the plurality of image data segments corresponding to each metadata segment for which the metadata criteria are not satisfied, wherein: the first processor-executable instructions further cause the at least one vehicle device to: transmit, by the at least one communication interface at the vehicle, each image data segment of the plurality of image data segments indicated in the at least one request; the second processor-executable instructions further cause the remote device to: receive by the communication interface of the remote device, each image data segment of the plurality of image data segments indicated in the at least one request; store, by the second at least one non-transitory processor-readable storage medium in the image data storage portion, each image data segment received in response to the at least one request; and store, by the second at least one non-transitory processor-readable storage medium in the reference metadata storage portion, each metadata segment of the plurality of metadata segments corresponding to each image data segment received in response to the at least one request.

The at least one vehicle device may comprise the image capture device; the first processor-executable instructions may cause the at least one image capture device to capture the plurality of image data segments; and the first processor-executable instructions may cause the at least one image capture device to generate the plurality of metadata segments associated with the plurality of image data segments. The first processor-executable instructions may cause the at least one vehicle device to transmit the plurality of metadata segments in response to generation of the plurality of metadata segments.

The first processor-executable instructions which cause the at least one vehicle device to transmit the plurality of metadata segments may cause the at least one vehicle device to transmit the plurality of metadata segments according with a schedule.

The at least one vehicle device may comprise the image capture device; the at least one communication interface at the vehicle may comprise a communication interface included in the image capture device; the first processor-executable instructions which cause the vehicle device to transmit the plurality of metadata segments may cause the image capture device to transmit, by the communication interface of the image capture device, the plurality of metadata segments; the second processor-executable instructions which cause the remote device to transmit the at least one request for each image data segment of the plurality of image data segments corresponding to each metadata segment for which the metadata criteria are not satisfied may cause the remote device to transmit, by the communication interface of the remote device to be received by the communication interface included in the image capture device, the request; and the first processor-executable instructions which cause the at least one vehicle device to transmit each image data segment of the plurality of image data segments indicated in the at least one request may cause the image capture device to transmit each image data segment of the plurality of image data segments indicated in the at least one request by the communication interface of the image capture device.

The communication interface of the remote device may comprise a first communication interface. The at least one vehicle device may comprise the image capture device and a peripheral device; the at least one communication interface of the vehicle device may comprise: a second communication interface included in the peripheral device; a third communication interface included in the peripheral device; a fourth communication interface included in the image capture device; and a fifth communication interface included in the image capture device. The second processor-executable instructions which cause the at least one vehicle device to transmit the at least one request for each image data segment of the plurality of image data segments corresponding to each metadata segment for which the metadata criteria are not satisfied may cause the remote device to: transmit the request by the first communication interface, to be received by the third communication interface of the peripheral device. The first processor-executable instructions may further cause the peripheral device to transmit the request by the second communication interface, to be received by the fourth communication interface of the image capture device; and the first processor-executable instructions which cause the at least one vehicle device to transmit each image data segment of the plurality of image data segments indicated in the at least one request may cause the image capture device to: transmit each image data segment of the plurality of image data segments indicated in the at least one request by the fifth communication interface to be received by the first communication interface of the remote device. The first processor-executable instructions which cause the at least one vehicle device to transmit the plurality of metadata segments associated with the plurality of image data segments may cause the at least one vehicle device to: transmit the plurality of metadata segments associated with the plurality of image data segments by the fourth communication interface of the image capture device to be received by the second communication interface of the peripheral device; and transmit the plurality of metadata segments associated with the plurality of image data segments by the third communication interface of the peripheral device to be received by the first communication interface of the remote device. Advantageously, transmitting metadata (low volume data) via the fourth, second, and third communication interfaces makes use of communication hardware of the peripheral device, and transmitting image data (high-volume data) via the fifth communication module allows appropriate communication hardware to be used according to the volume of data being transmitted.

Each metadata segment of the plurality of metadata segments may further indicate a respective location associated with a corresponding image data segment of the plurality of image data segments; the reference metadata storage portion may further store respective location metadata associated with image data stored in the image data storage portion; and the metadata criteria may further comprise the respective location indicated in the respective metadata segment of the plurality of metadata segments matching respective location metadata stored in the reference metadata storage portion.

The at least one vehicle device may comprise the image capture device; and the first at least one non-transitory processor-readable storage medium may be included in the image capture device at the vehicle.

The system may further comprise: a user input interface at the remote device. The second processor-executable instructions may further cause the remote device to: receive, by the user input interface of the remote device, a user input requesting at least one select image data segment, each select image data segment having an associated start time and an associated end time; for each select image data segment where the associated start time and the associated end time match a paired start time and end time in the metadata storage portion, output the select image data segment as stored in the image data storage portion; and for each select image data segment where the associated start time and the associated end time do not match a paired start time and end time in the metadata storage portion: transmit, by the communication interface of the remote device, a request for the select image data segment. The first processor-executable instructions may further cause the at least one vehicle device to: receive, by the at least one communication interface of the at least one vehicle device, the request for the select image data segment; and transmit, by the at least one communication interface of the at least one vehicle device for reception at by the communication interface of the remote device, the select image data segment in response to the request for the select image data segment. The second processor-executable instructions may further cause the remote device to: receive, by the communication interface of the remote device, the select image data segment; and store the select image data segment in the image data storage portion.

According to yet another broad aspect the present disclosure describes a method comprising: receiving, by a user input interface of a remote device separate from a vehicle, a user input requesting at least one select image data segment captured by at least one image capture device positioned at the vehicle, each select image data segment of the at least one select image data segment being associated with a respective select metadata segment, each select metadata segment indicating at least a respective start time and a respective end time of the associated select image data segment; accessing a library of reference metadata segments stored in a reference metadata storage portion of at least one second non-transitory processor-readable storage medium of the remote device, each reference metadata segment in the library of reference metadata segments indicating at least a respective start time and a respective end time of a corresponding image data segment of a library of image data segments stored in an image data storage portion of the at least one second non-transitory processor-readable storage medium; determining, by at least one processor of the remote device for each select metadata segment, whether metadata criteria are satisfied for the select metadata segment, the metadata criteria comprising at least: the start time and end time indicated in the select metadata segment matching a start time and end time of a reference metadata segment of the library of reference metadata segments stored in the reference metadata storage portion; for each select metadata segment for which the metadata criteria are satisfied: accessing the associated select image data segment as stored in the image data storage portion of the second non-transitory processor-readable storage medium; for each select metadata segment for which the metadata criteria are not satisfied: transmitting, by a communication interface of the remote device for reception by at least one vehicle device at the vehicle, at least one request for the select image data segment associated with the select metadata segment; and receiving, by the communication interface of the remote device, the select image data segment associated with the select metadata segment from the at least one vehicle device; and outputting each select image data segment of the at least one select image data segment.

The method may further comprise, for each select metadata segment for which the metadata criteria are not satisfied: receiving, by at least one communication interface of the at least one vehicle device at the vehicle, the at least one request for the select image data segment associated with the select metadata segment; and transmitting, by the at least one communication interface of the at least one vehicle device for reception by the remote device, the select image data segment indicated in the request. The at least one vehicle device may include the image capture device and a peripheral device. The communication interface of the remote device may include a first communication interface; the at least one communication interface of the at least one vehicle device may comprise: a second communication interface included in the peripheral device; a third communication interface included in the peripheral device; a fourth communication interface included in the image capture device; and a fifth communication interface included in the image capture device. Transmitting the at least one request may comprise: transmitting the at least one request by the first communication interface, for reception by the third communication interface of the peripheral device; and transmitting the at least one request by the second communication interface to be received by the fourth communication interface of the image capture device. Transmitting the select image data segment indicated in the at least one request may comprise: transmitting the select image data segment indicated in the at least one request by the fifth communication interface for reception by the first communication interface of the remote device.

The method may further comprise, for each select image data segment transmitted by the at least one communication interface of the at least one vehicle device: transmitting, by the at least one communication interface of the vehicle device for reception by the communication interface of the remote device, a select metadata segment associated with the select image data segment transmitted by the at least one communication interface of the at least one vehicle device; receiving, by the communication interface of the remote device, the select metadata segment associated with the select image data segment; storing the received select image data segment in the image data storage portion of the second non-transitory processor-readable storage medium; and storing the received select metadata segment in the reference metadata storage portion of the second non-transitory processor-readable storage medium.

The at least one select image data segment may include a plurality of select image data segments.

Each select metadata segment associated with a respective select image data segment may further indicate a respective location associated with the select image data segment; the reference metadata storage portion may further store respective location metadata associated with image data stored in the image data storage portion; and the metadata criteria may further comprise the respective location indicated in the respective select metadata segment matching respective location metadata stored in the reference metadata storage portion.

According to yet another broad aspect, the present disclosure describes a system for accessing image data captured at a vehicle, the system comprising: a reference metadata storage database; an image data storage database; a remote device separate from the vehicle, the remote device including a user input interface, a communication interface, at least one processor, and at least one non-transitory processor-readable storage medium storing processor-executable instructions which, when executed by the at least one processor cause the remote device to: receive, by the user input interface, a user input requesting at least one select image data segment captured by at least one image capture device positioned at the vehicle, each select image data segment of the at least one select image data segment being associated with a respective select metadata segment, each select metadata segment indicating at least a respective start time and a respective end time of the associated select image data segment; access a library of reference metadata segments stored in the reference metadata storage database, each reference metadata segment in the library of reference metadata segments indicating at least a respective start time and a respective end time of a corresponding image data segment of a library of image data segments stored in the image data storage database; determine, by the at least one processor for each select metadata segment, whether metadata criteria are satisfied for the select metadata segment, the metadata criteria comprising at least: the start time and end time indicated in the select metadata segment matching a start time and end time of a reference metadata segment of the library of reference metadata segments stored in the reference metadata storage database; for each select metadata segment for which the metadata criteria are satisfied: access the associated select image data segment as stored in the image data storage database; for each select metadata segment for which the metadata criteria are not satisfied: transmit, by the communication interface of the remote device for reception by at least one vehicle device at the vehicle, at least one request for the select image data segment associated with the select metadata segment; and receiving, by the communication interface of the remote device, the select image data segment associated with the select metadata segment from the at least one vehicle device; and outputting each select image data segment of the at least one select image data segment.

The at least one non-transitory processor-readable storage medium of the remote device may comprise the reference metadata storage database as a reference metadata storage portion, and may comprise the image data storage database as an image data storage portion.

The reference metadata storage database and the image data storage database may be separate from the remote device and the vehicle.

The system may further comprise the at least one vehicle device at the vehicle. The at least one vehicle device may include at least one communication interface and a processor-readable storage medium storing processor-executable instructions which, when executed by at least one processor of the at least one vehicle device cause the at least one vehicle device to, for each select metadata segment for which the metadata criteria are not satisfied: receive, by the at least one communication interface of the at least one vehicle device, the at least one request for the select image data segment associated with the select metadata segment; and transmit, by the at least one communication interface of the at least one vehicle device for reception by the remote device, the select image data segment indicated in the request. The at least one vehicle device may include an image capture device and a peripheral device. The communication interface of the remote device may include a first communication interface. The at least one communication interface of the at least one vehicle device may comprise: a second communication interface included in the peripheral device; a third communication interface included in the peripheral device; a fourth communication interface included in the image capture device; and a fifth communication interface included in the image capture device. The processor-executable instructions which cause the remote device to transmit the at least one request may cause the remote device to: transmit the at least one request by the first communication interface, for reception by the third communication interface of the peripheral device. The processor-executable instructions when executed by the at least one vehicle device may further cause the peripheral device to transmit the at least one request by the second communication interface to be received by the fourth communication interface of the image capture device; and the processor-executable instructions which cause the at least one vehicle device to transmit the select image data segment indicated in the at least one request may cause the image capture device to: transmit the select image data segment indicated in the at least one request by the fifth communication interface for reception by the first communication interface of the remote device.

For each select image data segment transmitted by the at least one communication interface of the at least one vehicle device: the processor-executable instructions executed by the processor of the at least one vehicle device may further cause the at least one vehicle device to transmit, by the at least one communication interface of the vehicle device for reception by the communication interface of the remote device, a select metadata segment associated with the select image data segment transmitted by the at least one communication interface of the at least one vehicle device; the processor-executable instructions executed by the processor of the remote device may further cause the remote device to: receive, by the communication interface of the remote device, the select metadata segment associated with the select image data segment; store the received select image data segment in the image data storage database; and store the received select metadata segment in the reference metadata storage database.

The at least one select image data segment may include a plurality of select image data segments.

Each select metadata segment associated with a respective select image data segment may further indicate a respective location associated with the select image data segment; the reference metadata storage database may further store respective location metadata associated with image data stored in the image data storage database; and the metadata criteria may further comprise the respective location indicated in the respective select metadata segment matching respective location metadata stored in the reference metadata storage database.

BRIEF DESCRIPTION OF THE DRAWINGS

Exemplary non-limiting embodiments are described with reference to the accompanying drawings in which.

DETAILED DESCRIPTION

Figure 1:
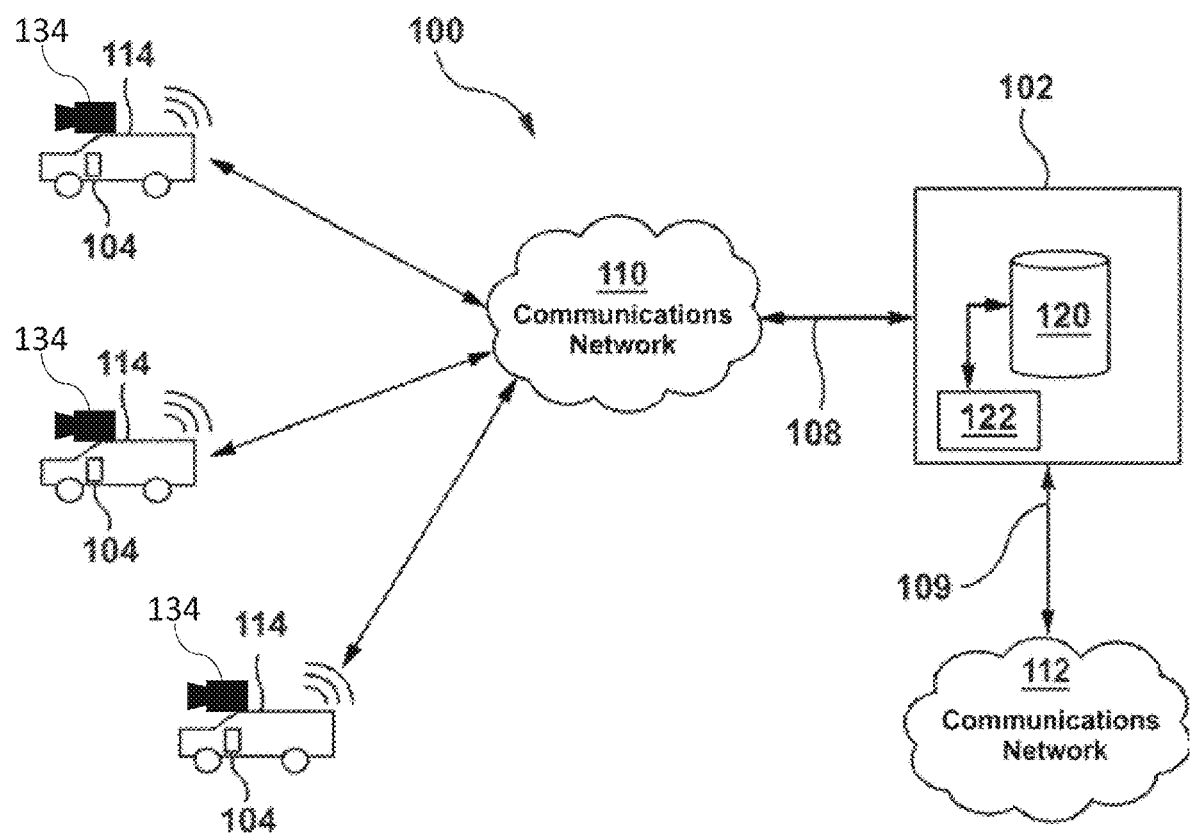
FIG. 1 is a schematic view of a telematics system.

The present disclosure details systems, methods, and devices for communicating, storing, and accessing image data pertaining to at least one vehicle. The present disclosure sees particular value in vehicle data collection systems, where image capture devices are positioned at vehicles.

Telematics systems have been employed by fleet owners to monitor use and performance of vehicles in the fleet. A telematics system monitors a vehicle using an onboard telematics device for gathering and transmitting vehicle operation information. For instance, fleet managers can employ telematics to have remote access to real time operation information of each vehicle in a fleet. A vehicle may include a car, truck, recreational vehicle, heavy equipment, tractor, snowmobile or other transportation asset. A telematics device may detect environmental operating conditions associated with a vehicle, for example, outside temperature, attachment status of an attached trailer, and temperature inside an attached refrigeration trailer. A telematics device may also detect operating conditions of an associated vehicle, such as position, (e.g., geographic coordinates), speed, and acceleration, time of day of operation, distance traveled, stop duration, customer location, idling duration, driving duration, among others. Hence, the telematics device collects and transmits data to the telematics system that is representative of the vehicle operation and usage execution.

This data may be collected over a time period of sufficient duration to allow for pattern recognition of the vehicle's operation. In an example the duration may be determined to be a number of days between 30 days and 90 days, though in practice any appropriate number of days could be implemented as the duration.

In an exemplary telematics system, raw vehicle data, including vehicle operation information indicative of a vehicle's operating conditions, is transmitted from an onboard telematics device to a remote subsystem, (e.g., data management system which may comprise a cloud system or a management system). Raw vehicle data may include information indicating the identity of the onboard telematics device (e.g., device identifier, device ID) and/or the identity of the associated vehicle the onboard telematics device is aboard. Specific and non-limiting examples of raw vehicle data includes device ID data, position data, speed data, ignition state data, (e.g. indicates whether vehicle ignition is ON or OFF), and datetime data indicative of a date and time vehicle operating conditions were logged by the telematics device. Raw vehicle data transmitted and collected over a period of time forms historical vehicle data which may be stored by the remote subsystem for future analysis of a single vehicle or fleet performance. In practice, a single fleet may comprise many vehicles, and thus large volumes of raw vehicle data (e.g., terabytes, petabytes, exabytes . . . ) may be transmitted to, and stored by, a remote subsystem. Throughout this application, vehicle data collected, processed, and/or transmitted by a telematics monitoring device can be broadly included in "telematic data", among other types of data such as location data discussed later.

Telematics system can include, or work in tandem with, image capture devices positioned at vehicles, as discussed later with reference to FIGS. 1, 2, 3, and 4.

In some exemplary telematics systems, a telematics device can have at least one processing unit thereon which processes or filters raw vehicle data, and transmits processed or filtered data. Such systems can reduce the bandwidth required for transmission and required storage capacity for transmitted data.

The use of telematics systems has resulted in improved performance and maintenance of vehicles in the fleet. Additionally, data from telematics systems can also be useful to analyze traffic, to provide information for infrastructure design, planning, and implementation.

Illustrated in FIG. 1 is a simplified block diagram of an exemplary telematics system for gathering and storing vehicle-related information. Telematics system 100 comprises telematics subsystem 102 having a first network interface 108 and onboard telematics devices 104 of vehicles 114 communicatively coupled therewith via communication network 110.

The telematics subsystem 102 in an implementation comprises a management system which is a managed cloud data warehouse for performing analytics on data stored therein. In another implementation, the management system may comprise a plurality of management systems, datastores, and other devices, configured in a centralized, distributed or other arrangement. In some implementations, one or more different management systems may be employed and configured separately or in a centralized, distributed or other arrangement. In the illustrated example, telematics subsystem 102 includes at least one non-transitory processor-readable storage medium 120 and at least one processor 122. The at least one non-transitory processor-readable storage medium 120 can store data on which analytics is performed, and/or can store instructions thereon. Said instructions, when executed by the at least one processor 122, cause the telematics subsystem to perform the desired operations, analysis, or data collection/aggregation. The telematics subsystem 102 can also be referred to as a management server, remote device, or network device. Such a management server, remote device, or network device can be a single device, or can be a distributed arrangement as discussed above.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi™, Bluetooth™, Ethernet, HTTP/S, TCP, and CoAP/DTLS, or other suitable protocol. Communication network 110 may take other forms as well.

Telematics system 100 may comprise another network interface 109 for communicatively coupling to another communication network 112. In an implementation, communication network 112 may comprise a communication gateway between the fleet owners and the telematics system 100.

Also shown in FIG. 1 are vehicles 114, each thereof having aboard the onboard telematics devices 104. A vehicle may include a car, truck, recreational vehicle, heavy equipment, tractor, snowmobile, or other transportation asset. Onboard telematics devices 104 may transmit raw vehicle data associated with vehicles 114 through the communication network 110 to the telematics subsystem 102.

Three telematics devices 104 are described in this example for explanation purposes only and embodiments are not intended to be limited to the examples described herein. In practice, a telematics system may comprise many vehicles 114, such as hundreds, thousands and tens of thousands or more. Thus, huge volumes of raw vehicle data may be received and stored by remote telematics subsystem 102.

In general, telematics devices 104 comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, and times of operation among others. One of ordinary skill in the art will appreciate that these are but a few types of vehicle operating conditions that may be detected.

Telematics device 104 may comprise a sensing module for determining vehicle position. For instance, the sensing module may utilize Global Positioning System (GPS) technology (e.g., GPS receiver) for determining the geographic position (Lat/Long coordinates) of vehicle 114. Alternatively, the sensing module utilizes another a global navigation satellite system (GNSS) technology, such as, GLONASS or BeiDou. Alternatively, the sensing module may further utilize another kind of technology for determining geographic position. In addition, the sensing module may provide other vehicle operating information, such as speed.

Alternatively, the telematics device 104 may communicate with a plurality of sensing modules for a vehicle.

Alternatively, vehicle position information may be provided according to another geographic coordinate system, such as, Universal Transverse Mercator, Military Grid Reference System, or United States National Grid.

In general, a vehicle 114 may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Telematics device 104 may comprise a monitoring module operable to communicate with a data/communication bus of vehicle 114. The monitoring module may communicate via a direct connection, such as, electrically coupling, with a data/communication bus of vehicle 114 via a vehicle communication port, (e.g., diagnostic port/communication bus, OBDII port). Alternatively, the monitoring module may comprise a wireless communication interface for communicating with a wireless interface of the data/communication bus of vehicle 114. Optionally, a monitoring module may communicate with other external devices/systems that detect operating conditions of the vehicle.

Telematics device 104 may be configured to wirelessly communicate with telematics subsystem 102 via a wireless communication module. In some embodiments, telematics device 104 may directly communicate with one or more networks outside vehicle 114 to transmit data (such as telematic data) to telematics subsystem 102. A person of ordinary skill will recognize that functionality of some modules may be implemented in one or more devices and/or that functionality of some modules may be integrated into the same device.

Telematics devices 104 may transmit raw vehicle data (or telematic data), indicative of vehicle operation information collected thereby, to telematics subsystem 102. The raw vehicle data may be transmitted at predetermined time intervals, (e.g. heartbeat), intermittently, and/or according to other predefined conditions. Raw vehicle data (or telematic data) transmitted from telematics devices 104 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

Also shown in FIG. 1 are image sensors 134, each aboard a respective vehicle 114. Each of image sensors 134 could for example be a camera, such as a video camera. Such image sensors capture image data (or video data, as a sequence of images) in a field of view of the respective image sensor. In some cases, an image sensor is positioned and oriented to capture image data representing a field of view outside the vehicle (e.g. a dash cam, rear view cam, or other camera pointed externally to the vehicle). In some cases, an image sensor is positioned and oriented to capture image data representing a field of view inside the vehicle (e.g. a driver-facing camera, a camera aimed at an instrument panel, or other camera pointed internally in the vehicle). In some cases, a vehicle can have multiple image sensors positioned thereat.

Similar to telematic data, image data captured by image sensors 134 can be transmitted to telematics subsystem 102 by communications network 110. Image data (in particular video data) is often large, and thus transmitting image data occupies significant transmission resources (bandwidth), and storing data occupies significant storage resources. It is desirable to avoid redundant transmission and storage of image data to save transmission and storage resources. In some implementations, communication hardware of telematics devices can have limited bandwidth capabilities. For example, transmission speed or quantity from a telematics device can be throttled to reduce power consumption. As another example, a telematics device which transmits data from a vehicle may be old, such that the communication hardware thereon is inherently limited in capabilities. In such cases, communication hardware of the telematics device may be inadequate or inappropriate for transmitting large amounts of image data from an image sensor 134 over communications network 110.

Figure 2:
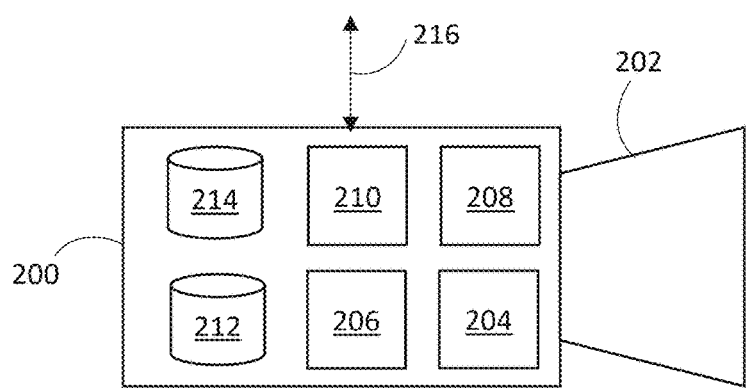
FIG. 2 is a block diagram of an image capture device, in accordance with at least one illustrated example.

Now referring to FIG. 2, shown is a simplified block diagram of exemplary image capture device 200 according to one implementation (as a smart video camera). Image capture device 200 as shown in FIG. 2 can be implemented as any of the image capture devices 134 shown in FIG. 1. Image capture device 200 includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the "at least one non-transitory processor-readable storage medium" includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. telematics subsystem 102 discussed with reference to FIG. 1) over a communication network (e.g. communications network 110 discussed with reference to FIG. 1).

Figure 3:
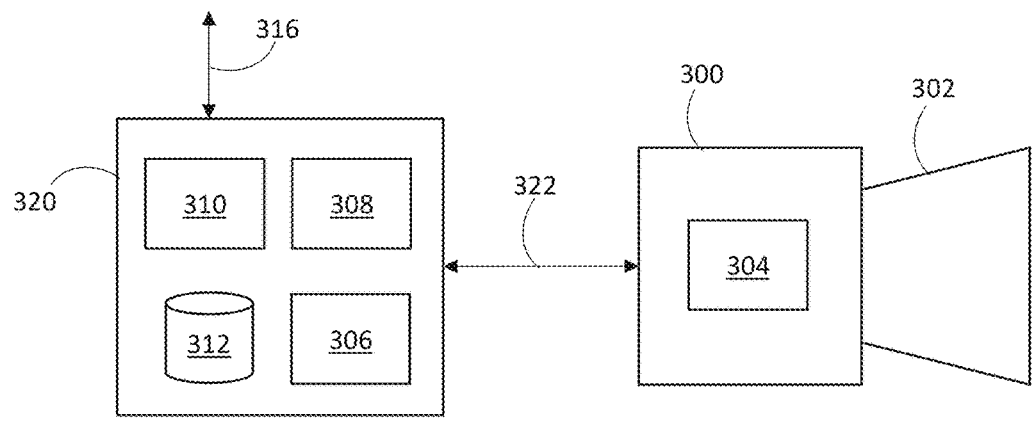
FIGS. 3 and 4 are block diagrams of image capture devices and peripheral devices, in accordance with at least two illustrated examples.

Now referring to FIG. 3, shown is a simplified block diagram of exemplary image capture device 300 according to one implementation (as a camera which is coupled to a peripheral device, such as a telematics device or other vehicle device). FIG. 3 includes many similar components to those discussed with reference to FIG. 2. The description of such components in FIG. 2 is applicable to similar components in FIG. 3. In FIG. 3, image capture device 300 includes lens 302 and optoelectronics 304 (similar to lens 202 and optoelectronics 204 in FIG. 2). In this implementation, image capture device 300 is itself directed to capturing image data, which is in turn provided to a peripheral device 320 via a communication interface 322 (e.g. a wired or wireless communication interface). In some implementations, peripheral device 320 is a vehicle device, such as a telematics monitoring device positioned at a vehicle. In other implementations, peripheral device 320 comprises a collection of components integrated into a vehicle which communicate with each other (e.g. OEM integrated electronics). In FIG. 3, peripheral device 320 is shown as including at least one processor 306 (similar to the at least one processor 206), the location module 308 (similar to the location module 208), the wireless communication module 310 (similar to the wireless communication module 210), and the at least one non-transitory processor-readable storage medium 312 (similar to the at least one non-transitory processor-readable storage medium 212). While not illustrated in FIG. 3 to reduce clutter, the at least one non-transitory processor-readable storage medium 312 optionally includes any appropriate number of additional non-transitory processor-readable storage mediums. Wireless communication module 310 is operable to communicate (shown as communication interface 316) with other devices (e.g. telematics subsystem 102 discussed with reference to FIG. 1) over a communication network (e.g. communications network 110 discussed with reference to FIG. 1).

Collectively, reference to an image capture device 134 or a plurality of image capture devices 134 can include image capture device 200 in FIG. 2 or image capture device 300 in FIG. 3. Further, reference to an image capture device performing acts (such as in the methods discussed herein) can also refer to the peripheral device 320 performing such acts. For example, reference to an image capture device performing processing, determination, identification, storing of data, transmission, or similar acts can refer to an image capture device and peripheral device in combination performing these acts.

Figure 4:
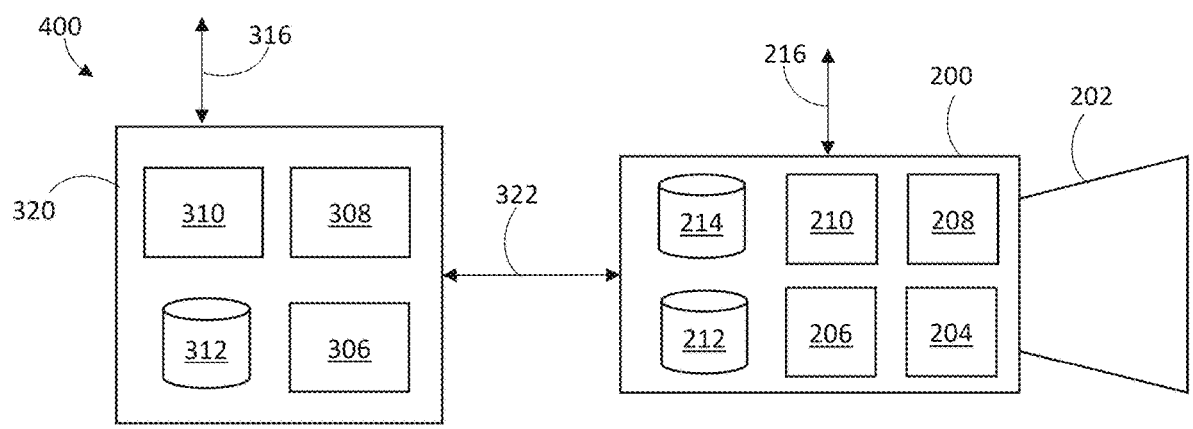

Now referring to FIG. 4 shown is a simplified block diagram of a system 400 including an exemplary image capture device 200 (as shown in FIG. 2) and a peripheral device 300 (as shown in FIG. 3), according to one implementation (as a camera which is coupled to a peripheral device, such as a telematics device or other vehicle device). In FIG. 4, acts can be performed by any appropriate component of either image capture device 200 or peripheral device 300. As such, throughout this disclosure, reference to an image capture device performing acts (such as in the methods discussed herein) can refer to the peripheral device 320 or the image capture device 200 performing such acts.

Figure 5:
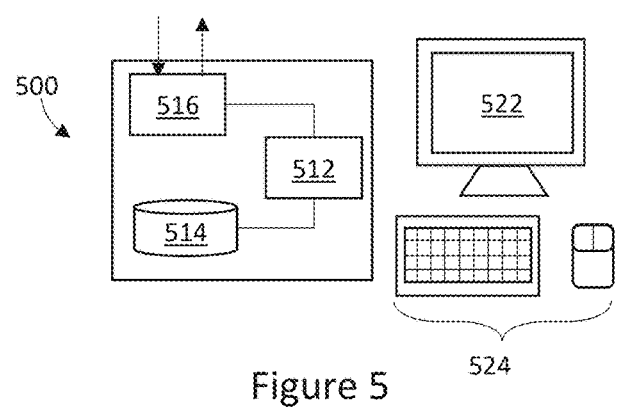
FIG. 5 is a schematic view of an operator device.

FIG. 5 is a schematic view of an operator device 500, which could be used for data management, access, or use in any of the implementations discussed herein, and in particular is useful as a server-side device. For example, device 500 could be a device which includes telematics subsystem 102 in FIG. 1, or could be a device used as client device which accesses telematics subsystem 102 in FIG. 1, or could be a device which accesses data provided by telematics subsystem 102 (e.g. via communication network 112). Device 500 as illustrated includes at least one processor 512, at least one non-transitory processor-readable storage medium 514, and a communication interface 516. The non-transitory processor-readable storage medium 514 can have processor-readable instructions stored thereon which, when executed by the at least one processor 512 cause the device 500 to perform appropriate operations for the methods described herein. Communication interface 516 can be a wired or wireless interface, through which data and inputs can be provided to device 500, and through which data and outputs can be provided by device 500. For example, image data or metadata for a plurality of vehicles can be received from a telematics device or system by communication interface 516, for processing and analysis by the at least one processor 512. Resulting analysis can also be output by communication interface 516.

FIG. 5 also illustrates exemplary input and output devices (input and output interfaces) through which a user or operator can interact with device 500. In particular, FIG. 5 shows a display 522, which can display outputs from device 500. Other output devices could be provided such as speakers, or any other appropriate output device. FIG. 5 also shows a keyboard and mouse 524, which can be used to provide inputs to the device 500. Other input devices could also be used, such as a touchscreen, microphone, trackpad, or any other appropriate input device. Although the input and output devices illustrated in FIG. 5 appear in the form of those used with a desktop computer, other forms of devices could also be used, such as portable devices like a laptop, smartphone, PDA, tablet, or any other appropriate device. Further, a device to which a user provides input and receives output can be remote from the device 500. For example, the device including the at least one processor 512, the at least one non-transitory processor-readable storage medium 514, and the communication interface 516 can be a server, which is remote from a workstation or device with which the user interacts.

Figure 6:
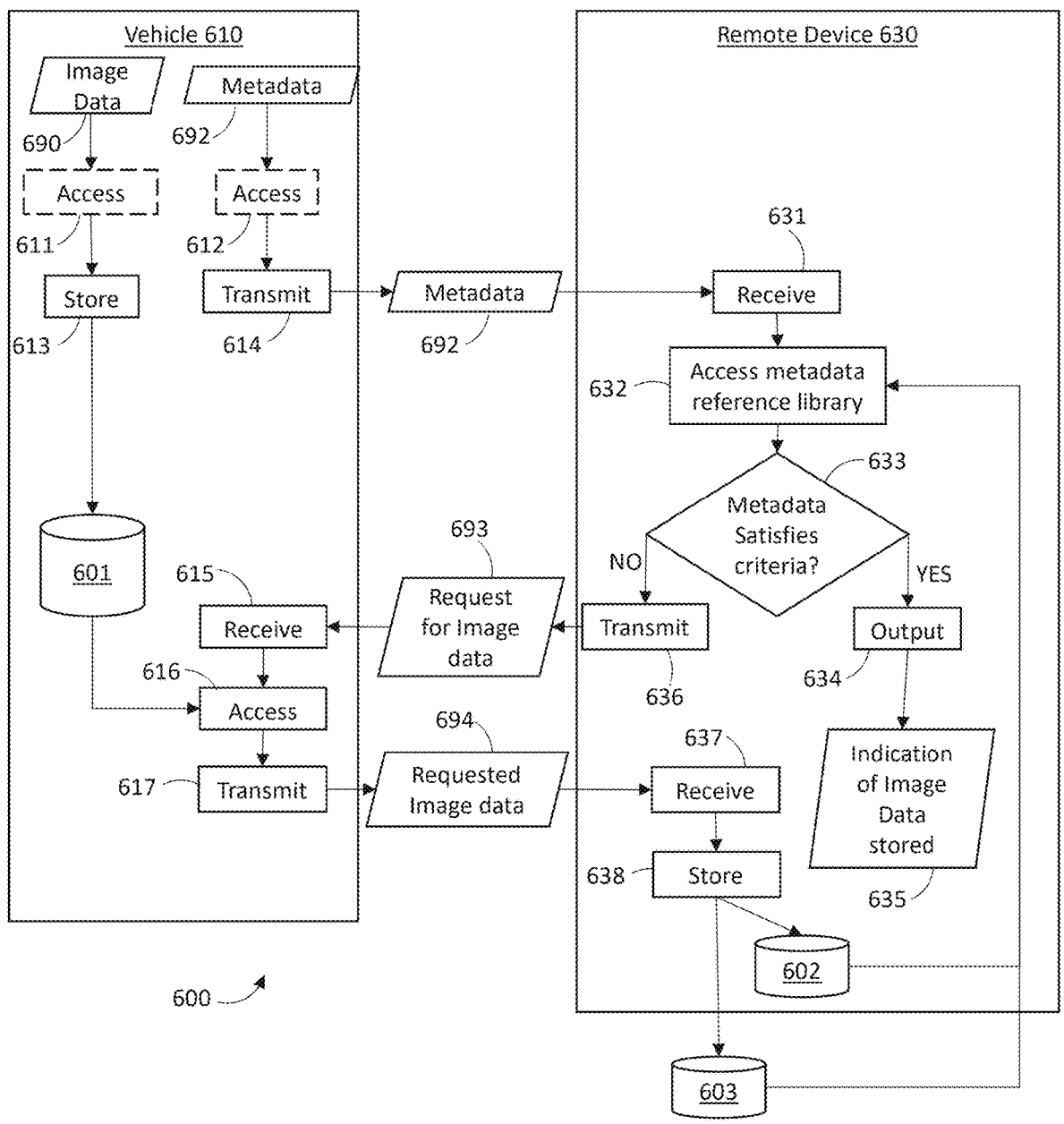
FIG. 6 is a flowchart diagram of a method for verifying and storing captured image data.

FIG. 6 is a flowchart diagram which illustrates an exemplary method 600 for communicating image data. Method 600 as illustrated includes acts performed at a vehicle 610 such as by a vehicle device (illustrated as acts 611, 612, 613, 614, 615, 616, and 617), and acts performed at a remote device 630 such as a management server (illustrated as acts 631, 632, 633, 634, 636, 637, and 638). One skilled in the art will appreciate that additional acts could be added, acts could be removed, or acts could be reordered as appropriate for a given application. For example, acts 611 and 612 are shown in dashed lines to illustrate that these acts may be outside of the scope of the method 600 in some implementations.

With reference to the examples illustrated in FIGS. 1, 2, 3, 4, and 5 acts can be performed by appropriate components of systems such as system 100 in FIG. 1, image capture device 200 in FIG. 2, image capture device 300 and/or peripheral device 320 in FIG. 3, image capture device 200 and/or peripheral device 320 in FIG. 4, and/or system 500 in FIG. 5. For example, acts performed at vehicle 610 can be performed by any of the telematics device 104 or image capture devices 134 in FIG. 1, the image capture device 200 in FIG. 2, the image capture device 300 and/or the peripheral device 320 in FIG. 3, or the image capture device 200 and/or the peripheral device 320 in FIG. 4. Acts performed at the remote device 630 can be performed by the at least one telematics subsystem 102 in FIG. 1, and or the operator device 500 in FIG. 5. Transmissions between vehicle 610 and remote device 630 can occur through a communication network such as a cellular communication network and/or the internet (e.g. communication networks 110 and 112). Further, FIG. 13 discussed later illustrates an exemplary arrangement which include multiple devices at a vehicle; acts of method 600 can be performed by appropriate components of the devices shown in FIG. 13, as discussed later.

As an example, acts of transmission and reception can be performed by appropriate communication modules; acts of preparing messages, applying models, or determination can be performed by an appropriate at least one processor; acts of storing or providing access can be performed by an appropriate at least one non-transitory processor-readable storage medium. Further, any of the discussed at least one non-transitory processor-readable storage mediums can have processor-executable instructions stored thereon, which when executed by a respective at least one processor cause a respective device or component to perform a given act of method 600.

At 611, a plurality of image data segments 690 are accessed at vehicle 610. A "segment" of image data refers to image data which spans from a start time to an end time. In this sense, each image data segment is associated with a respective start time and a respective end time. For example, with vehicle-based image capture devices, image data is often broken up into several different files representing lengths of time; each of these files can be considered as a "segment" of image data in the present disclosure. The represented length of time is commonly set (e.g. 1 minute, but any other appropriate length of time could be set), but not every image data segment is necessarily the set length. As an example, some vehicle-based image capture devices only capture image data while an engine of the vehicle is on, or an accessory function of the vehicle is on. As a result, when a driver shuts off the vehicle, a shorter image data segment may be created because the set length was not reached for the segment when the vehicle was shut off.

In some implementations, act 611 includes capturing the plurality of image data segments. In particular, in such implementations the scope of method 600 includes an image capture device (e.g. any of devices 134, 200, or 300) at the vehicle viewing a scene at the vehicle (e.g. front or rear views from the vehicle, or an interior view of the cabin of the vehicle) and generating the plurality of image data segments representing the scene.

In other implementations, capturing of the image data is outside of the scope of method 600, and act 611 instead refers to receiving or retrieving the image data as captured. That is, the scope of such implementations focuses on devices which communicate with, but do not include, the image capture device at the vehicle which performs the capturing. For example, acts performed at vehicle 610 in method 600 can be performed by a telematics device (e.g. 134), a peripheral device (e.g. 320), or any other appropriate device.

Accessing the plurality of image data segments at 611 can include interpreting, processing, decompressing, formatting, or performing any other operations on the data so as to be usable by the device accessing the data.

At 613, the plurality of image data segments are stored by a first at least one non-transitory processor-readable storage medium at the vehicle 610 (shown in FIG. 6 as medium 601). The first at least one non-transitory processor-readable storage medium could be, for example, any of the non-transitory processor-readable storage mediums 212, 214, or 312 discussed with reference to FIGS. 2, 3, and 4.

At 612, a plurality of metadata segments 692 are accessed at vehicle 610. A metadata segment in this context refers to metadata which corresponds to or is associated with an image data segment. In particular, each metadata segment in the plurality of metadata segments 692 indicates at least a respective start time and end time for the image data segment to which the metadata segment corresponds. Such metadata is useful because image data itself may not include this information. For example, while encoded image data can include timing information, such information is sometimes limited to the timeline of the file (e.g. a start time of the image segment is time=0). Metadata on the other hand can include timing information for the file relative to a standard clock (e.g. relative to a clock at the vehicle device, or relative to a server-based clock). Such metadata can be used to identify image data segments, as discussed in detail later with reference to act 633.

Further, metadata is not limited to timing information. Metadata can also include other information such as location, device ID, vehicle ID, or any other appropriate information, as discussed in detail later. The plurality of metadata segments 692 can be generated at the time of, or shortly after capturing associated image data segments 690. For example, when capturing an image data segment, a corresponding metadata segment can be generated which includes the start time and end time of the image data segment (e.g. based on a clock of the image capture device). Other metadata can be included based on other sensors or sensor data. As one example, a vehicle ID (or device ID) can be included in the metadata segment (such as extracted from an interface of the vehicle such as data port 1321 discussed later with reference to FIG. 13, or as accessed from a storage medium such as 212, 214, or 312 in FIG. 2, 3, or 4). As another example, location data could be included in the metadata segment, as captured or received by a location sensor at the vehicle.

At 614, a first communication interface at the vehicle (such as any of communication interfaces 210 or 310 discussed with reference to FIGS. 2, 3, and 4) transmits the plurality of metadata segments 692. Act 614 can be performed at any appropriate cadence or frequency. In one example, each metadata segment of the plurality of metadata segments 692 can be transmitted in response to or shortly after the generation of the metadata segment. In another example, metadata segments can be uploaded in batches or bundles, for example according to a schedule (e.g. every 30 minutes, or other appropriate interval). As yet another example, the plurality of metadata segments can be uploaded once a threshold number of metadata segments are queued for transmission (e.g. 30 segments are available, or any other appropriate number).

At 631, a second commutation interface (e.g. communication interface 516 in FIG. 5) of the remote device 630 receives the plurality of metadata segments 692. Receiving the plurality of metadata segments 692 can include formatting, decompressing, or otherwise processing the metadata 692 to be of a format usable by the remote device 630.

At 632, a metadata reference library is accessed from at least one second non-transitory processor-readable storage medium of remote device 630, shown as medium 602 and/or medium 603 in FIG. 6 (and could be for example any of non-transitory processor-readable storage mediums 120 or 514 in in FIGS. 1 and 5).

Medium 602 in FIG. 6 includes at least one exemplary non-transitory processor-readable storage medium at the remote device 630. Medium 603 on the other hand includes at least one exemplary non-transitory processor-readable storage medium separate from remote device 630. For example, medium 603 can be at a network storage device or database, and/or could be distributed across multiple devices as cloud storage.

The second non-transitory processor-readable storage medium includes a reference metadata portion which stores each reference metadata segment, and an image data portion which stores a library of image data segments. In some implementations, the reference metadata portion and the image data portion are respective partitions or regions of one or more non-transitory processor-readable storage mediums. In other implementations, the reference metadata portion can be one (or more) non-transitory processor readable storage mediums, and the image data portion can be one (or more) non-transitory processor-readable storage mediums which are non-overlapping with the non-transitory processor-readable storage mediums for the reference metadata. The "second at least one non-transitory processor-readable storage medium" can include any appropriate number of mediums to achieve such implementations, either on a single device or distributed across multiple devices.

An example of how the reference metadata and the image data are stored remote from the vehicle 610 is discussed in more detail later with reference to FIG. 7. Briefly, the reference metadata is separately stored to provide an easily accessible database of metadata for the image data stored in the image data portion. "Separately stored" can refer to the image data and the reference metadata being stored on different storage mediums, or different regions (e.g. partitions or drive sectors) of a common storage medium. Image data is typically much larger than metadata, and as such storing the reference metadata together with the corresponding image data would decrease search, find, and access speeds (increase search, find and access times) for the reference metadata, thus making finding data more difficult, and more time and resource intensive. Instead, separating the reference metadata and corresponding image data as discussed with reference to FIG. 7 enables storing data at appropriate locations based on access frequency and purpose. For example, the reference metadata can be stored in an easily and quickly accessible location (such as locally at an operator device), whereas the image data can be "archived" in a less convenient, but still accessible, location, such as at a remote data storage facility. In such an implementation, the reference metadata is quickly and easily accessible, thus enabling fast finding and searching of desired data, which can thus be used to selectively access limited quantities of image data as needed, thereby saving storage space and access bandwidth at the easily accessible location.

Reference metadata storage portion 722 can alternatively be referred to as a reference metadata storage database, and image data storage portion 724 can alternatively be referred to as an image data storage database. Such nomenclature can be particularly useful where reference metadata storage portion 722 and image data storage portion 724 are physically separate (e.g. different storage drives or devices).

Figure 7:
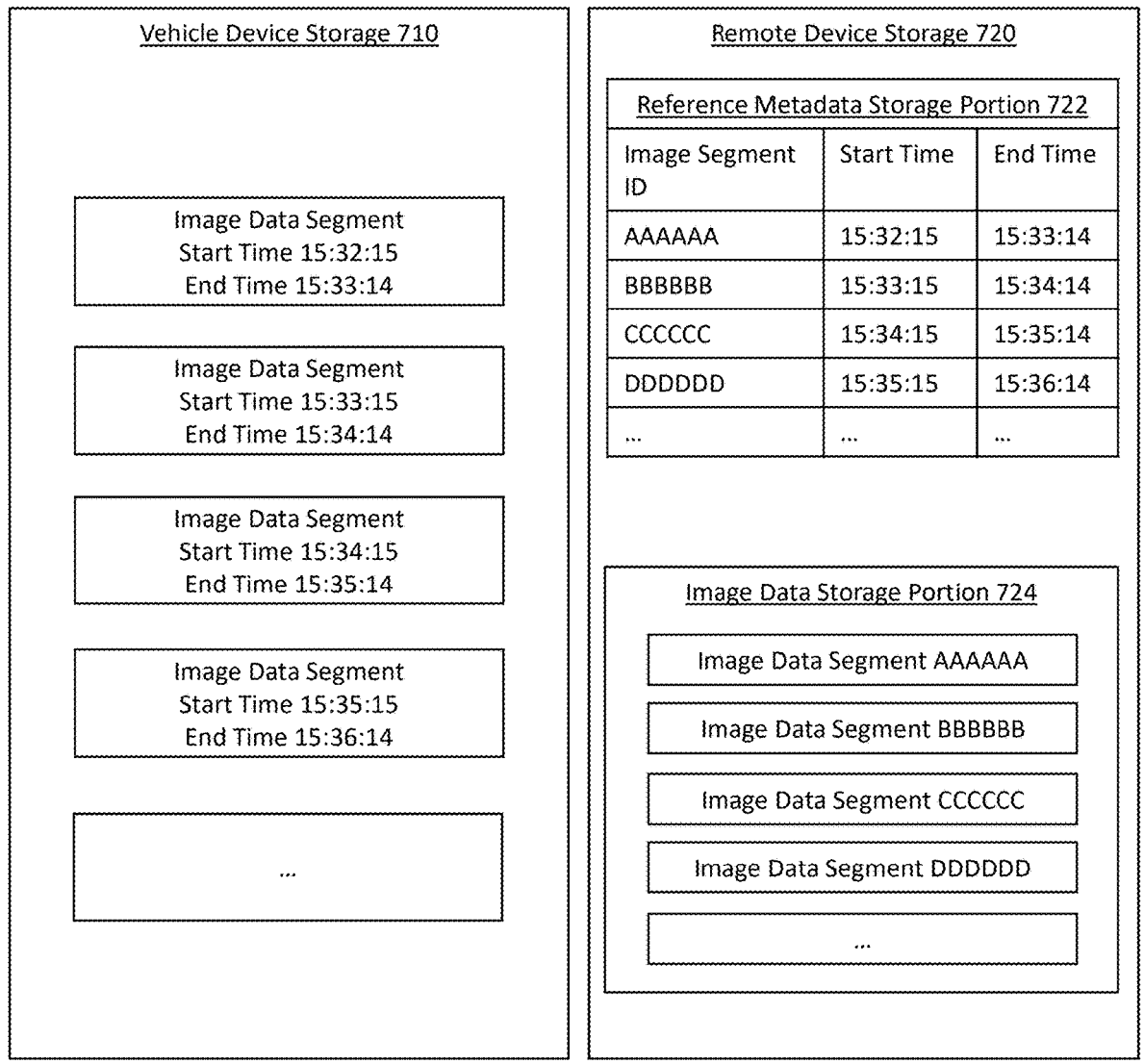
FIG. 7 is a schematic diagram of an image data storage arrangement.

FIG. 7 is a schematic diagram which illustrates an exemplary storage structure for image data and metadata, as useful throughout this disclosure. FIG. 7 illustrates vehicle device storage 710, which shows how image data and metadata can be stored at a vehicle device (e.g. at any of the non-transitory processor-readable storage mediums 212, 214, or 312 discussed with reference to FIG. 2, 3, or 4). In the illustrative example, each image data segment is stored together with respective metadata for the image data segment. For example, each image data segment and corresponding metadata segment can be stored as a single file. As another example, each image data segment can be stored as a single file, cross-indexed with a corresponding metadata segment stored as another file. As yet another example, metadata can be parsed in fields of a corresponding image data segment; e.g., start and end times for an image data segment can be included in a title of the image data segment file.

FIG. 7 shows four image data segments stored at the vehicle device storage 710, but any number of image data segments and corresponding metadata segments can be stored at the vehicle device storage 710. Further, vehicle device storage 710 may be limited, and as such the image data segments and corresponding metadata segments can be stored in a circular buffer, where new image data and metadata overwrites older image data and metadata.

FIG. 7 shows remote device storage 720 (e.g. at non-transitory processor-readable storage medium 120 of telecommunications subsystem 102, non-transitory processor-readable storage medium 514 at management device 500, non-transitory processor-readable storage mediums 602 or 603 in FIG. 6, or any other non-transitory processor-readable storage medium accessible to the remote device 630, such as a networked or cloud storage database). FIG. 7 shows the same four image data segments which are stored at the vehicle device storage 710, and the corresponding metadata, as stored in remote device storage 720.

Remote device storage 720 as shown includes a reference metadata storage portion 722 and an image data storage portion 724. Image data storage portion 724 in the example functions as a "data lake". That is, image data storage portion 724 is a storage portion which ingests and stores image data in an unstructured form (e.g. in its original form). Storing the image segments in a data lake advantageously allows a diverse range of image data to be readily stored, from different types of image capture devices and structured in any number of different formats, without having to reformat or restructure the data (which is processor intensive). When an image data segment is received and ingested at the remote device 630, a corresponding metadata segment is received or extracted. Both the Image data segment and the metadata segment are associated with a unique identifier (ID). The metadata segment is stored in structured Reference Metadata storage Portion 722. Reference Metadata Storage Portion 722 is structured and contains less data than image data storage portion 724, and is thus much less processor-intensive to search. Reference Metadata Storage Portion 722 can also be said to store a "reference metadata library": that is, a library of reference metadata corresponding to image data stored in the image data storage portion 724. Consequently, when checking whether a particular image data segment is stored in Image Data Storage Portion 724 (as in act 632 of method 600 or act 833 of method 800 discussed later), reference metadata portion 722 can be checked instead. If no reference metadata segment in the reference metadata storage portion corresponds to the metadata criteria, this means the requested image data segment is not stored in Image Data Storage Portion 724. Thus, significant processing resources are saved in determining the presence or non-presence of any particular image data segment in Image Data Storage portion 724 (compared to searching the Image Data Storage Portion itself for the particular segment of image data).

Further, in some implementations, the ID can be indicative of a particular storage location of the image data segment in the Image Data Storage Portion 724 (e.g., the ID could be a pointer which points to a storage address of the corresponding segment of image data), or the reference Metadata Storage Portion 722 can include a field for each reference metadata segment which indicates a storage location of the corresponding image data segment. In this way, when seeking a particular segment or plurality of segments of image data, the corresponding segments of reference metadata can be located in the Reference Metadata Storage Portion 722, and the ID or storage location field can then be used to quickly access the particular segment or segments of image data in the Image Data Storage Portion.

Returning to method 600 in FIG. 6, at 633 the plurality of metadata segments 692 received from the vehicle 610 at 631 are compared to metadata criteria, to determine whether the metadata criteria are satisfied for each metadata segment in the plurality of metadata segments 692. The metadata criteria can include any appropriate criteria, such as respective start time and end time indicated in the respective metadata segment. In this example, comparing the plurality of metadata segments received from the vehicle comprises, for each metadata segment, comparing the respective start time and end time indicated in the metadata segment to reference metadata segments in the library of reference metadata (reference metadata stored in the reference metadata storage portion 722). If the respective start time and end time of the metadata segment matches a start time and end time of a reference metadata segment in the reference metadata library, the metadata criteria are satisfied for the metadata segment. In essence, the plurality of metadata segments are compared to the reference metadata library to identify whether the reference metadata library indicates that any of the metadata segments are already stored at the remote device. The metadata criteria can include other criteria, as appropriate or applicable; for example the metadata criteria can include location, as discussed in more detail later.

For metadata segments where the metadata criteria are satisfied (the reference metadata library indicates that the metadata segment is already stored in the image data storage portion), method 600 proceeds to act 634. For metadata segments where the metadata criteria are not satisfied (the reference metadata library indicates that the metadata segment is not already stored in the image data storage portion), method 600 proceeds to act 636.

At 634, the remote device 630 outputs an indication 635 that the image data segment (corresponding to the metadata segment for which the metadata criteria are satisfied) is already stored at the image data storage portion. This output can take different forms as appropriate for a given application. In one example, act 634 comprises transmitting the indication 635 to the vehicle 610 (e.g. via communication interfaces 108 or 516 in FIGS. 1 and 5). Indication 635 in this example can act as an indication or instruction for the image data segment corresponding to the metadata segment for which the metadata criteria are satisfied to not be transmitted from vehicle 610, such that transmission bandwidth is saved, and the image data is not redundantly stored at the remote device 630 such that storage resources are saved. In this example, indication 635 can be an explicit instruction (e.g. a specific command which instructs the device at vehicle 610 to not transmit the image data segment), or could be a more passive indication which is interpreted at the vehicle 610 (e.g. indication 635 only indicates that the image data segment is already stored at the remote device 630, and the device at vehicle 610 interprets this and makes a decision to not transmit the image data segment).

In some implementations, act 634 comprises outputting a single indication for each image data segment of the plurality of image data segments for which the metadata criteria are not satisfied (that is, indication 635 can be an aggregated indication for a subset of the plurality of image data segments for which the metadata criteria are not satisfied). In some implementations, act 634 comprises outputting a respective indication for each image data segment of the plurality of image data segments for which the metadata criteria are not satisfied (that is, a plurality of indications 635 can be output, each indication corresponding to a respective image data segment for which the metadata criteria are not satisfied).

In some implementations, act 634 is optional. Instead, a lack of request for image data 693 (discussed later) can be an implicit indication that the image data is already stored in the image data storage portion.

In contrast, if the metadata criteria are not satisfied at 633, method 600 proceeds to act 636. At 636, the remote device 630 transmits (e.g. by communication interface 108 or 516 in FIGS. 1 and 5) a request 693 for each image data segment for which the metadata criteria are not satisfied. At 615 the request 693 is received at the vehicle 610 (e.g. by the communication interface 210 or 310 in FIGS. 2, 3, and 4). At 616, the device at vehicle 610 accesses the image data segment (as requested) as stored in medium 601. At 617, the device at vehicle 610 transmits (e.g. by the communication interface 210 or 310 in FIG. 2, 3, or 4) the requested image data segment 694 (as accessed at 616). At 637, the remote device 630 receives (e.g. via communication interface 108 or 516 in FIGS. 1 and 5) the requested image data 694.

In some implementations, act 636 comprises transmitting a single request for each image data segment of the plurality of image data segments for which the metadata criteria are not satisfied (that is, request 693 can be an aggregated request for a subset of the plurality of image data segments for which the metadata criteria are not satisfied). In some implementations, act 636 comprises transmitting a respective request for each image data segment of the plurality of image data segments for which the metadata criteria are not satisfied (that is, a plurality of requests 694 can be transmitted, each request corresponding to a respective image data segment for which the metadata criteria are not satisfied).

In some implementations, act 617 comprises transmitting each image data segment of the plurality of image data segments for which the metadata criteria are not satisfied as a bundled or aggregated transmission. In some implementations, act 617 comprises transmitting each requested image data segment of the plurality of image data segments for which the metadata criteria are not satisfied as an independent transmission.

At 638, the remote device 630 stores the requested image data 694 at a non-transitory processor-readable storage medium. For example, the remote device 630 can store the requested image data 694 in at least one local storage medium 602, or at a separate storage medium 603, as discussed earlier. In particular, the requested image data 694 is stored in the image data storage portion 724 discussed with reference to FIG. 7. Further, the metadata corresponding to the requested image data 694 (e.g. as received at 631, or as transmitted together with the requested image data 694 at 617) is stored in the reference metadata storage portion 722 discussed with reference to FIG. 7. In this way, the reference metadata library is updated to prevent a future duplicate transmission or storage of image data segments.

In method 600 in FIG. 6, transmission bandwidth and storage space are saved, by checking whether image data is stored accessible to remote device 630 prior to transmitting the image data from vehicle 610. In particular, by first transmitting metadata 692, and checking whether the metadata satisfies metadata criteria compared to reference metadata from a library, it can be ascertained whether the image data is already stored accessible to the remote device 630. When the image data is already stored accessible to the remote device 630, a duplicate does not need to be transmitted and stored, thus saving transmission bandwidth and storage space.

Various circumstances can lead to potential duplicate data transmission and storage which is averted by method 600 in FIG. 6. As one example, a device at vehicle 610 may be restarted or initialized, and in so doing may attempt to upload image data stored thereat, regardless of whether said image data has already been uploaded. As another example, in some implementations image data can be uploaded on demand (e.g. in response to a user request or a request from remote device 630 based on other data, such as telematics data indicating a significant event such as a collision). Method 600 in FIG. 6 prevents duplicate upload and storage of image data if the demand for image data pertains to already uploaded data. A method for managing image data requests is described in detail with reference to FIG. 8 discussed below.

Figure 8:
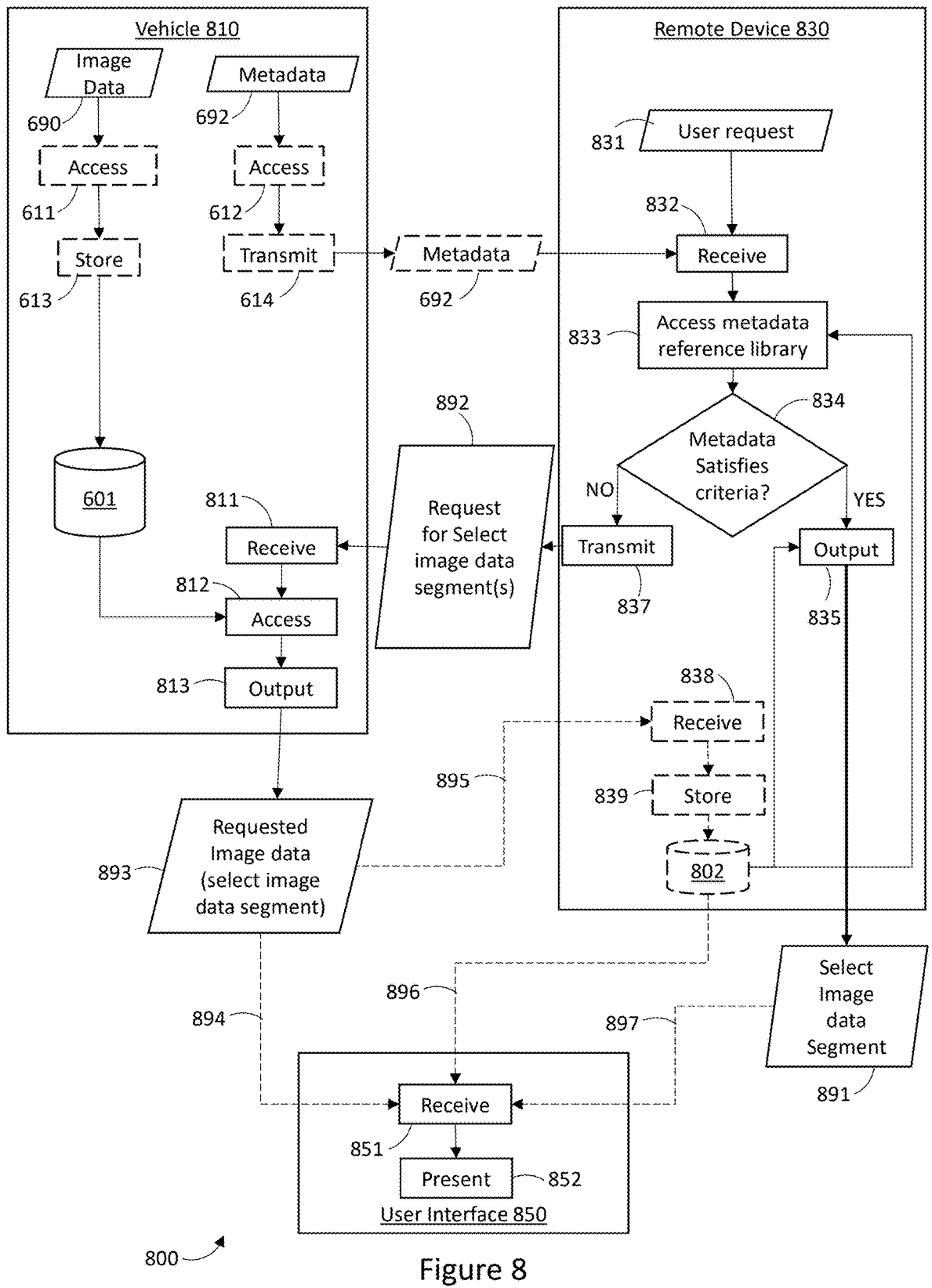
FIG. 8 is a flowchart diagram of a method for requesting captured image data.

FIG. 8 is a flowchart diagram which illustrates an exemplary method 800 for communicating image data. Method 800 as illustrated includes acts performed at a vehicle 810 such as by a vehicle device (illustrated as acts 611, 612, 613, 614, 811, 812, and 813), acts performed at a remote device 830 such as a management server (illustrated as acts 832, 833, 834, 838, and 839), and acts performed at a user interface 850 (illustrated as acts 851 and 852). One skilled in the art will appreciate that additional acts could be added, acts could be removed, or acts could be reordered as appropriate for a given application. For example, acts 611, 612, 613, 614, 838 and 839 are shown in dashed lines to illustrate that these acts may be outside of the scope of, or omitted from, the method 800.

With reference to the examples illustrated in FIGS. 1, 2, 3, 4, and 5, acts can be performed by appropriate components of systems such as system 100 in FIG. 1, image capture device 200 in FIG. 2, image capture device 300 and/or peripheral device 320 in FIG. 3, image capture device 200 and/or peripheral device 320 in FIG. 4, and/or system 500 in FIG. 5. For example, acts performed at vehicle 810 can be performed by any of the telematics device 104 or image capture devices 134 in FIG. 1, the image capture device 200 in FIG. 2, the image capture device 300 and/or the peripheral device 320 in FIG. 3, or the image capture device 200 and/or the peripheral device 320 in FIG. 4. Acts performed at the remote device 830 can be performed by the at least one telematics subsystem 102 in FIG. 1, and or the operator device 500 in FIG. 5. Acts perform at the user interface 850 can be performed by an appropriate interface such as discussed with reference to operator device 500 in FIG. 5.

For example, acts of transmission and reception can be performed by appropriate communication modules; acts of preparing messages, applying models, or determination can be performed by an appropriate at least one processor; acts of storing or providing access can be performed by an appropriate at least one non-transitory processor-readable storage medium. Further, any of the discussed at least one non-transitory processor-readable storage mediums can have processor-executable instructions stored thereon, which when executed by a respective at least one processor cause a respective device or component to perform a given act of method 800.

FIG. 8 illustrates acts 611, 612, 613, and 614, where image data 690 and associated metadata 692 are accessed, stored, and/or transmitted at vehicle 810, similar to as discussed earlier with reference to FIG. 6 and not repeated for brevity. These acts are shown in dashed lines to illustrate that they may be outside of the scope of method 800 in some cases. In particular, these acts relate to the acquisition of image data and metadata at the vehicle, which may be performed prior to method 800.

At 832, remote device 830 receives a user input 831 requesting at least one select image data segment. Each image data segment of the at least one select image data segment is associated with a metadata segment, each associated metadata segment indicating at least a respective start time and a respective end time of the associated select image data segment. The user input can be received by a user interface of the remote device 830, or from a user device via a communication interface of the remote device 830. FIG. 5 discussed earlier illustrates exemplary input interfaces and communication interfaces by which a user can provide input.

In an exemplary scenario, a user can provide input requesting at least one image data segment corresponding to a particular time frame or event. For example, the user could input a time frame of interest, and each image data segment within this time frame of interest can be a "select image data segment". As another example, an exception event (e.g. speeding, collision, or other vehicles anomalies) where operation of the vehicle 810 satisfies (or violates) a rule or rules can be identified based on telematics data (e.g. as received from a telematics device 104) for the vehicle 810. The user input can comprise a user requesting at least one select image data segment corresponding to the exception event (e.g. by clicking a button or link to retrieve image data for an event). Exemplary user interfaces are discussed later with reference to FIGS. 9 to 12.

At 833, a metadata reference library is accessed from at least one second non-transitory processor-readable storage medium 802 at or accessible to remote device 830 (such as non-transitory processor-readable storage mediums 120 or 514 in in FIGS. 1 and 5). FIG. 8 shows second non-transitory processor-readable storage medium 802 as being included in remote device 830, but in some implementations the second non-transitory processor-readable medium is separate from, but accessible to (e.g. via network), the remote device 830. The storage arrangement shown and discussed with reference to FIG. 7 is fully applicable in the context of method 800 in FIG. 8. The second non-transitory processor-readable storage medium 802 includes a reference metadata portion (e.g. reference metadata storage portion 722 in FIG. 7) which stores each reference metadata segment, and an image data storage portion (e.g. image data storage portion 724 in FIG. 7) which stores a library of image data segments. In some implementations, the reference metadata portion and the image data portion are respective partitions or regions of one or more non-transitory processor-readable storage mediums. In other implementations, the reference metadata portion can one (or more) non-transitory processor readable storage mediums, and the image data portion can be one (or more) non-transitory processor-readable storage mediums which are non-overlapping with the non-transitory processor-readable storage mediums for the reference metadata. The "second at least one non-transitory processor-readable storage medium" can include any appropriate number of mediums to achieve such implementations, either on a single device or distributed across multiple devices. The discussion of a reference metadata library (as stored in the metadata storage portion 722) with reference to FIG. 7 is fully applicable to the reference metadata library in FIG. 8. Further, accessing the reference metadata library in act 833 is similar to accessing the reference metadata library in act 632 discussed with reference to FIG. 6, and the description thereof is applicable to FIG. 8.

At 834 the user request received at 832 is compared to metadata criteria, to determine whether the metadata criteria are satisfied for information or metadata in the user request. For example, the user request can indicate a respective start time and end time for each select image data segment being requested (as discussed earlier with reference to act 831). In this example, comparing the user request to the metadata criteria comprises, for each requested select image data segment, comparing the respective start time and end time of the select image data segment to reference metadata segments in the library of reference metadata. If the respective start time and end time of the select image data segment matches a start time and end time of a reference metadata segment in the reference metadata library, the metadata criteria are satisfied. In essence, information regarding the requested select at least one image data segment is compared to the reference metadata library to identify whether the reference metadata library indicates that any of the select image data segments are stored at or accessible to the remote device 830. The metadata criteria can include any other criteria or combination of criteria, as appropriate or applicable; for example the metadata criteria can include location, as discussed in more detail later.

For a requested image data segment where the metadata criteria are satisfied (the reference metadata library indicates that the select image data segment is stored in the image data storage portion accessible to remote device 830), method 800 proceeds to act 835. For a select image data segment where the metadata criteria are not satisfied (the reference metadata library indicates that the select image data segment is not already stored in the image data storage portion accessible to remote device 830), method 800 proceeds to act 837.

At 835, the remote device 830 outputs any select image data segments (any requested image data segments for which the metadata criteria are satisfied) which are stored at the image data storage portion of the second at least one processor-readable storage medium 802. Outputting of select image data segments is discussed in more detail later, with further reference to act 813.

In contrast, for each select image data segment for which the metadata criteria are not satisfied at 834, method 800 proceeds to act 837. At 837, the remote device 830 transmits (e.g. by network interface 108 or communication interface 516) a request 892 for any select image data segments for which the metadata criteria are not satisfied. At 811 the request is received at the vehicle 810 (e.g. by the communication interface 216 or 316). At 812, the device at vehicle 810 accesses the at least one select image data segment or segments (as requested) as stored in medium 601. At 813, the device at vehicle 810 outputs (e.g. by the communication interface 216 or 316) the requested at least one select image data segment or segments 893 (as accessed at 812).

If the requested at least one select image data segment is not available at non-transitory processor-readable storage medium 601 (e.g. the image data segment was already overwritten by newer image data), then act 813 can instead comprise outputting an indication that the requested data is not available. In cases where some of the at least one requested image data segments are available, but some image data segments are not available, act 813 can comprise outputting the available image data segments and outputting an indication of non-availability for image data segments which are not available.

In some implementations, act 837 comprises transmitting a single request for each select image data segment for which the metadata criteria are not satisfied (that is, request 892 can be an aggregated request for a plurality of select image data segments for which the metadata criteria are not satisfied). In some implementations, act 837 comprises transmitting a respective request for each select image data segment for which the metadata criteria are not satisfied (that is, a plurality of requests 892 can be transmitted, each request corresponding to a respective select image data segment for which the metadata criteria are not satisfied).

In some implementations, act 813 comprises outputting each select image data segment of the plurality of image data segments for which the metadata criteria are not satisfied as a bundled or aggregated output. In some implementations, act 813 comprises transmitting each requested image data segment of the plurality of image data segments for which the metadata criteria are not satisfied as an independent transmission.

In some implementations, outputting select image data segments in acts 835 and 813 (select image data segments 891 and 893) comprises transmitting the select image data segments to a user interface 850 separate from vehicle 810 and remote device 830 (e.g. where operator device 500 acts as a client or interface device separate from a remote device 830; transmission can occur for example via network interface 109 or communication interface 516). In such implementations, outputting the requested select image data segment or plurality of select image data segments at 813 can comprise transmitting the requested image data from the device at the vehicle 810 to the user interface 850, where they are received at 851, without first transmitting the requested image data to the remote device 830 (shown in FIG. 8 as transmission route 894). Further in such implementations, outputting the at least one select image data segment or segments at 835 can comprise transmitting the requested image data from the remote device 830 to the user interface 850, where they are received at 851 (shown in FIG. 8 as transmission route 897).

In some implementations, outputting the at least one select image data segments in act 813 (select image data segments 893) comprises transmitting the at least one select image data segments to remote device 830, shown as transmission route 895 in FIG. 8. In such implementations, the requested at least one select image data segment or segments 893 are received by the remote device 830 at 838 (e.g. by network interface 108 or communication interface 516), and stored in act 839 at second non-transitory processor-readable storage medium 802 accessible to the remote device 830. Further, the reference metadata library is updated to include metadata segments corresponding to the requested image data. In this way, a future request for select image data can find corresponding reference metadata in the reference metadata library, satisfying metadata criteria at 834, and thus enabling output of the select image data at 835 without needing to request the select image data from the vehicle 810.

In some optional implementations where the requested at least one select image data segment 893 is transmitted to remote device 830, the requested at least one select image data segment 893 is also transmitted to the user interface 850 via transmission route 894. In such implementations, the at least one select image data segment 893 is transmitted at least twice, to present the select image data to the user, and to make the at least one select image data segment 893 available to the remote device 830 for future access.

In some optional implementations where the requested at least one select image data segment 893 is transmitted to remote device 830, the requested at least one select image data segment 893 is subsequently provided to the user interface 850 by the remote device 830 via the transmission route 896. In this way, the requested image data is transmitted from the vehicle 810 once, but still made available to the remote device 830 (for future access), and presented to the user as a response to the user request 831.

Where a plurality of select image data segments are output in act 835 or in act 813, the plurality of select image data segments can be output in aggregate (e.g. several select image data segments are grouped together in a transmission), the each select image data segment can be output separately (e.g. an individual transmission can be sent for each select image data segment).

At 851, the user interface receives the at least one select image data segment via any of communication paths 894, 896, and/or 897. Similar to as discussed with regards to other acts of reception, a communication interface of the user interface (e.g. communication interface 516 where the operator device 500 acts as the user interface 850) receives transmission signals including the at least one select image data segment. Receiving as in act 851 can also comprise any appropriate associated acts, such as formatting, decompressing, processing, or other such as in order for the select image data segments to be in a form usable by the user interface 850.

At 852, the user interface 850 presents the at least one select image data segment. For example, the at least one select image data segment can be presented for viewing by a user of the user interface 850 (such as an operator who requested the at least one image data segment), via an output device (such as display 522 in FIG. 5). Exemplary user interfaces for presenting select image data segments are discussed below with reference to FIGS. 9-12.

Figure 9:
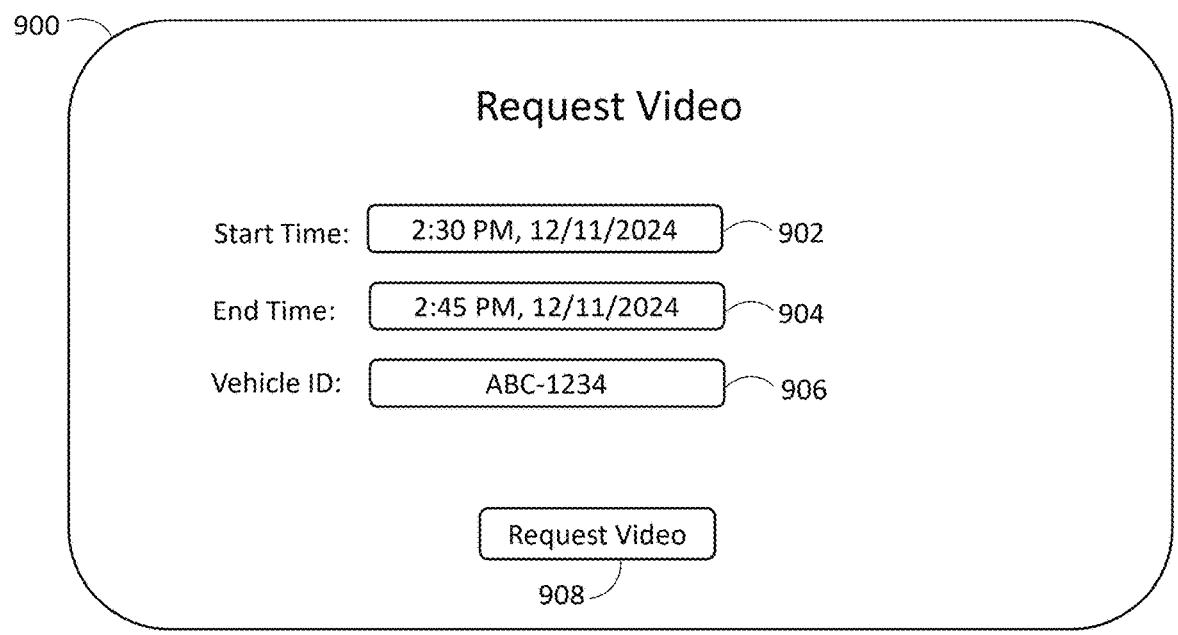
FIGS. 9, 10, 11, and 12 illustrate exemplary user interfaces for requesting and presenting video data, in accordance with at least four exemplary implementations.

FIG. 9 illustrates an exemplary user interface 900, which can be presented via a display (such as display 522 in FIG. 5). User interface 900 shows a video (image data) request screen, whereby a user can request image data. In the illustrative example, the user can fill three input fields 902, 904, and 906, though one skilled in the art will appreciate that any appropriate number of input fields could be utilized or filled. Input field 902 is for a start time of the requested image data, input field 904 is for the end time of the requested image data, and input field 906 is for an identifier of the vehicle. In the illustrated example, the user has filled input fields 902 and 904 to cover a 15 minute range, though any appropriate time range could be covered at the discretion of the user. Further, in the illustrated example, the vehicle ID in field 906 is a license plate number of the vehicle, but any appropriate identifier could be used, such as VIN or other identifier. Further, any appropriate other fields could be utilized, such as location (whether specific such as coordinates, or general such as region), driver identifier, vehicle type, or any other information.

FIG. 9 also shows button 908, which when pressed by the user sends the request for image data for reception by the remote device (as in act 832 of FIG. 8).

Figure 10:
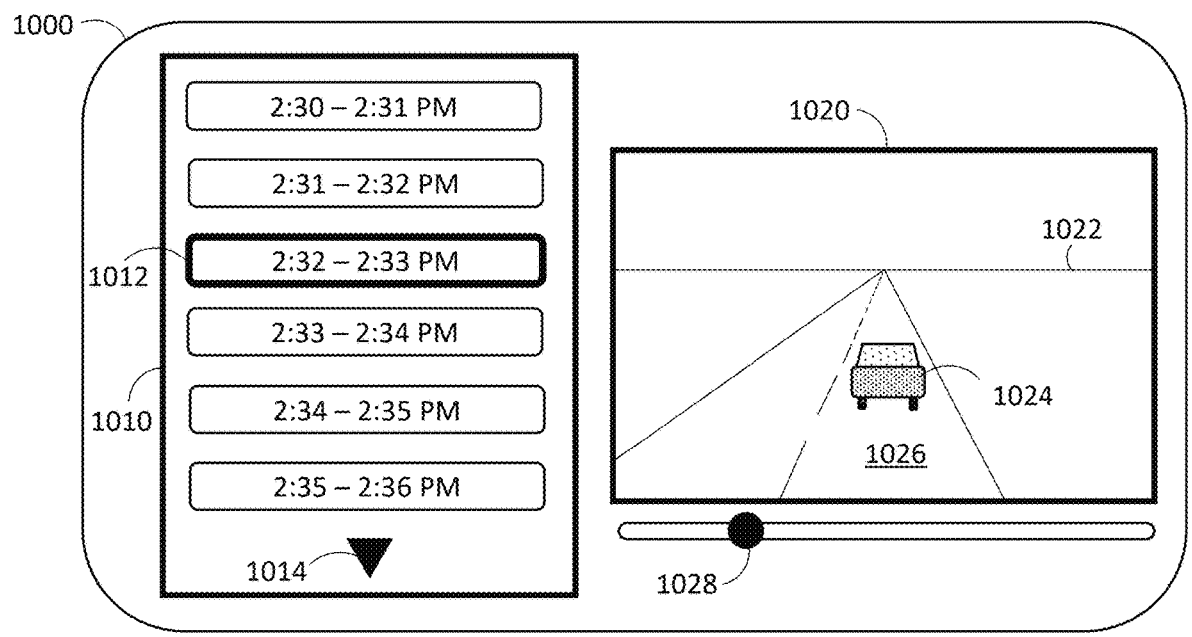

FIG. 10 illustrates an exemplary user interface 1000, which can be presented via a display (such as display 522 in FIG. 5). User interface 1000 shows a video (image data) output screen, whereby requested image data is presented to a user. In the illustrated example, the image data presented by user interface 1000 is the image data requested in FIG. 9. In particular, in the illustrated example, user interface 1000 includes an image data segment selection window 1010 and an image data output window 1020.

Image data segment selection window 1010 allows a user to select a particular image data segment to view. In the example, image data segments are one minute long, and the user can select a particular image data segment to view by clicking a button corresponding to the image data segment (as shown by time frame corresponding to each image data segment). In the example, a particular image data segment 1012 is selected, corresponding to image data for 2:32 PM to 2:33 PM. In the illustrated example, image data segment selection window does not show all possible image data segments as they do not fit within the user interface 1000. Image data segment selection window 1010 includes an arrow 1014 which a user can click on to move down the list of image data segments to select segments not presently illustrated.

Image data segment selection window 1010 is optional. In alternative implementations, a time slider or other form of temporal selection could be implemented to select particular image data or an image data segment to view.

Image data output window 1020 shows an image data segment provided in response to the user request. In the illustrated example, image data output window 1020 shows image data segment 1012, which is image data representing a vehicle 1024 (positioned in front of a vehicle from which the image data was captured) traveling down a road 1026 towards horizon 1022. Further, navigation controls such as a time slider (shown as 1028), play/pause, fast forward, rewind, or other control could be presented for navigating the presented image data. If available, audio corresponding to the image data segment can be output by an audio output device such as speakers or headphones.

In some implementations, image data segment selection window 1010 could be omitted, with the functionality thereof incorporated into image data output window 1020. For example, time slider 1028 could represent the entirety of the requested image data, and moving time slider 1028 could navigate across multiple image data segments.

The example of FIGS. 9 and 10 advantageously provide a flexible interface for a user to request and be presented with any desired image data.

Figure 11:
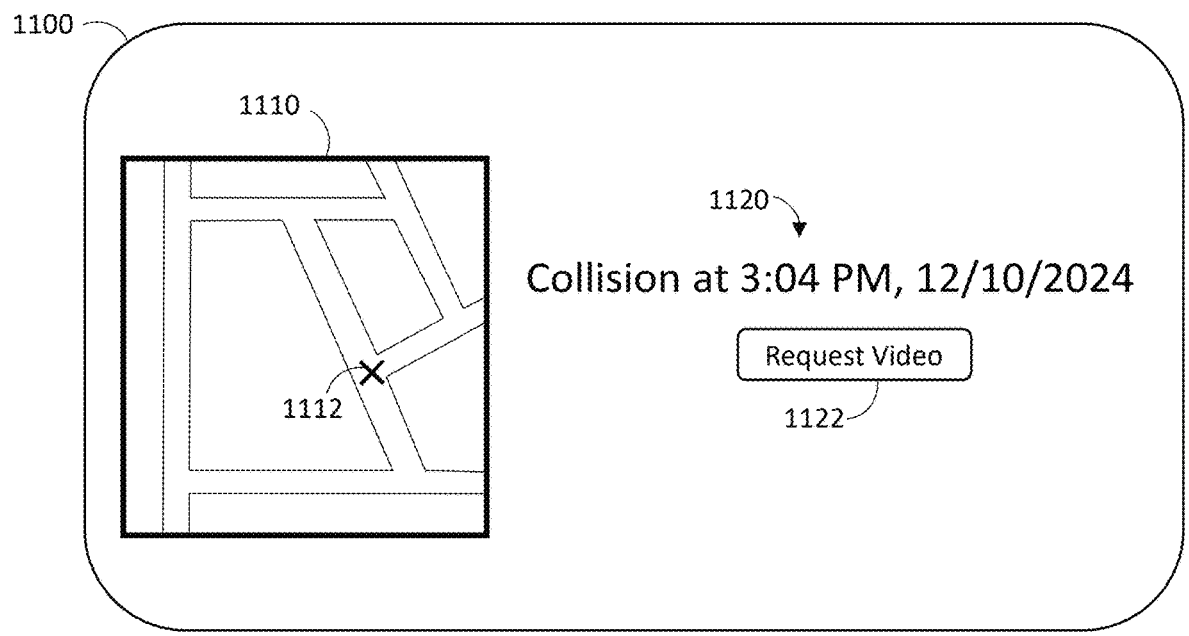

FIG. 11 illustrates an exemplary user interface 1100, which can be presented via a display (such as display 522 in FIG. 5). User interface 1100 shows a video (image data) request screen, whereby a user can request image data. In the illustrative example, an important event is identified: in particular, a collision is automatically identified based on telematics data for a vehicle (e.g. accelerometer data for the vehicle indicates a sudden change in acceleration indicative of a collision, such as acceleration being above a collision threshold).

The identified event is not limited to being a collision. Any other notable or important event could be identified based on the telematic data. As one example, an event could be a harsh driving event (abrupt change in speed, acceleration, or direction). As another example, an event could be when a vehicle enters, exits, or is otherwise present in a particular region of interest (e.g. where position data for the vehicle in the telematics data indicates the vehicle is at the location of interest). Systems, methods, and devices for identifying events and triggering upload of image data are described in detail in U.S. Provisional Patent Application No. 63/566,616 and US Non-Provisional patent application Ser. Nos. 19/081,110 and 19/081,180, the entirety of each of which are incorporated by reference herein.

In the illustrative example, user interface 1000 includes a map region 1110, which shows a location 1112 where the collision occurred (e.g. based on location data included in the telematics data for the vehicle at the time of the collision). Further in the illustrative example, user interface 1100 includes a label 1120 showing a time when the collision occurred (e.g. based on a timestamp for the telematics data based on which the collision was identified). Further still, FIG. 11 also shows button 1122, which when pressed by the user sends a request for image data for reception by the remote device (as in act 832 of FIG. 8). The exact temporal boundaries of the requested image data can be user-defined or pre-defined (e.g. a set amount such as 2 minutes before and after the collision), or could be determined autonomously (e.g. a time prior to the collision where unusual or erratic telematics data is observed). Other exemplary time frames are possible.

Figure 12:
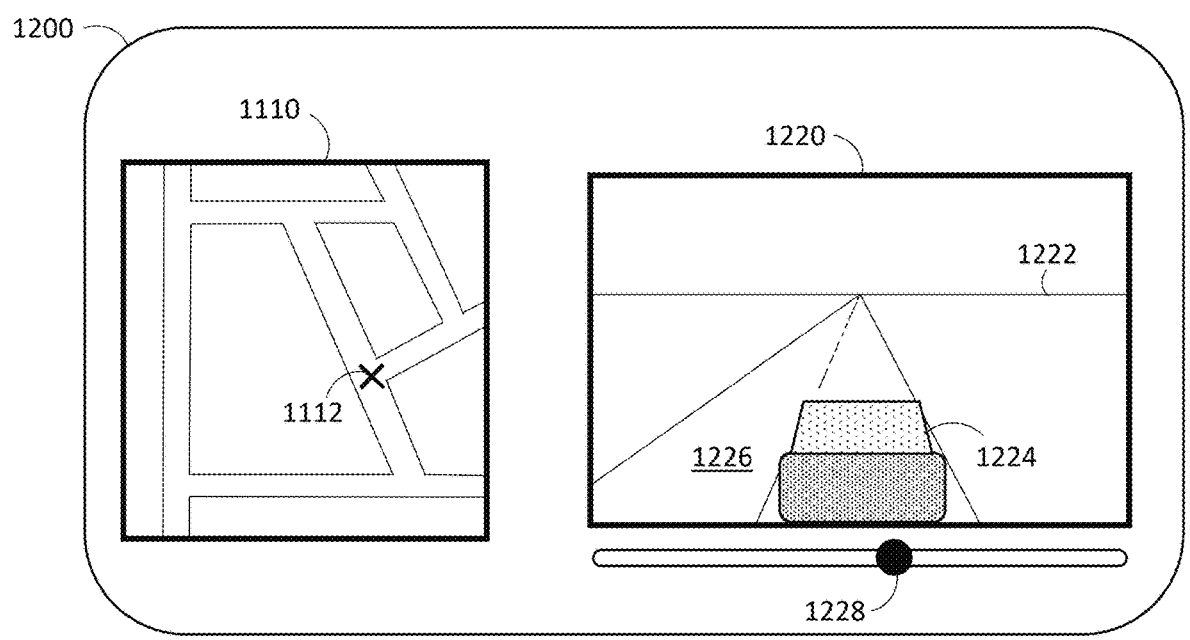

FIG. 12 illustrates an exemplary user interface 1200, which can be presented via a display (such as display 522 in FIG. 5). User interface 1200 shows a video (image data) output screen, whereby requested image data is presented to a user. In the illustrated example, the image data presented by user interface 1200 is the image data requested in FIG. 11. In particular, in the illustrated example, user interface 1200 includes map region 1110, which is the same as described with reference to FIG. 11, and an image data output window 1220.

Image data output window 1220 shows an image data segment provided in response to the user request. In the illustrated example, image data output window 1220 shows at least one image data segment, which is image data representing a vehicle 1224 (which has collided with the vehicle from which the image data was captured) on a road 1226 which extends towards horizon 1222. Further, navigation controls such as a time slider (shown as 1228), play/pause, fast forward, rewind, or other control could be presented for navigating the presented image data. Where the requested image data include a plurality of image data segments, time slider 1228 can navigate across the plurality of segments in the illustrated example. Alternatively, an image data segment selection window such as shown in FIG. 10 could be presented for a user to select an image data segment to view. If available, audio corresponding to the image data segment can be output by an audio output device such as speakers or headphones.

The example of FIGS. 11 and 12 advantageously provide a streamlined and effective interface for a user to request image data for important events.

The examples of FIGS. 9, 10, 11, and 12 are merely illustrative, and any appropriate user interfaces could be implemented for requested, presenting, and viewing image data.

Method 600 in FIG. 6 includes act 633, and method 800 in FIG. 8 includes act 834, both directed to comparing metadata segments to reference metadata, to determine whether the metadata segments satisfy the metadata criteria. As discussed earlier, the metadata criteria can include respective start times and respective end times for image data segments associated with the metadata segments. Also as mentioned earlier, the metadata segments can include additional data, and the metadata criteria can also take such additional data into account. For example, other metadata can be included based on other sensors or sensor data.

As one example, a vehicle ID (or device ID) can be included in the metadata segment (such as extracted from an interface of the vehicle such as data port 1321 discussed later with reference to FIG. 13, or as accessed from a storage medium such as 212, 214, or 312 in FIG. 2, 3, or 4). In some implementations, the reference metadata library can also include Vehicle ID or Device ID for a vehicle or device which captures the corresponding image data. In such implementations, the metadata criteria can also require that the vehicle ID and/or device ID in a given metadata segment matches a vehicle ID and/or device ID in a reference metadata segment in the reference metadata library (in addition to other metadata, such as start time and end time).

As another example, location data could be included in the metadata segment, as captured or received by a location sensor at the vehicle. In some implementations, the reference metadata library can also include location data for where the corresponding image data was captured. In such implementations, the metadata criteria can also require that the location data for a given metadata segment matches location data in a reference metadata segment in the reference metadata library (in addition to other metadata, such as start time and end time). Location data for a given metadata segment (or reference metadata segment) can take a variety of forms. For example, the location data could be a single instant of location data, indicating the location of the vehicle at the start time, end time, or any other particular moment during the metadata segment. Such an implementation advantageously limits collection and computation of location data. In another example, the location data could be a sequence or curve of location data, indicating a location of the vehicle over the course of the particular metadata segment. Such an implementation is more computationally intensive, but is more stringent than a single point of location data.

In some cases, an exact match of location data between a particular metadata segment and a reference metadata segment may not be required to satisfy the metadata criteria. For example, a location sensor may capture location data at a different frequency (or de-synchronized from) from image data captured by an image sensor. As such, location data may correspond to different moments in time. To address this, the metadata criteria may only require that location data for a metadata segment be within a threshold distance to location data for a reference metadata segment for location-based metadata criteria to be satisfied.

Figure 13:
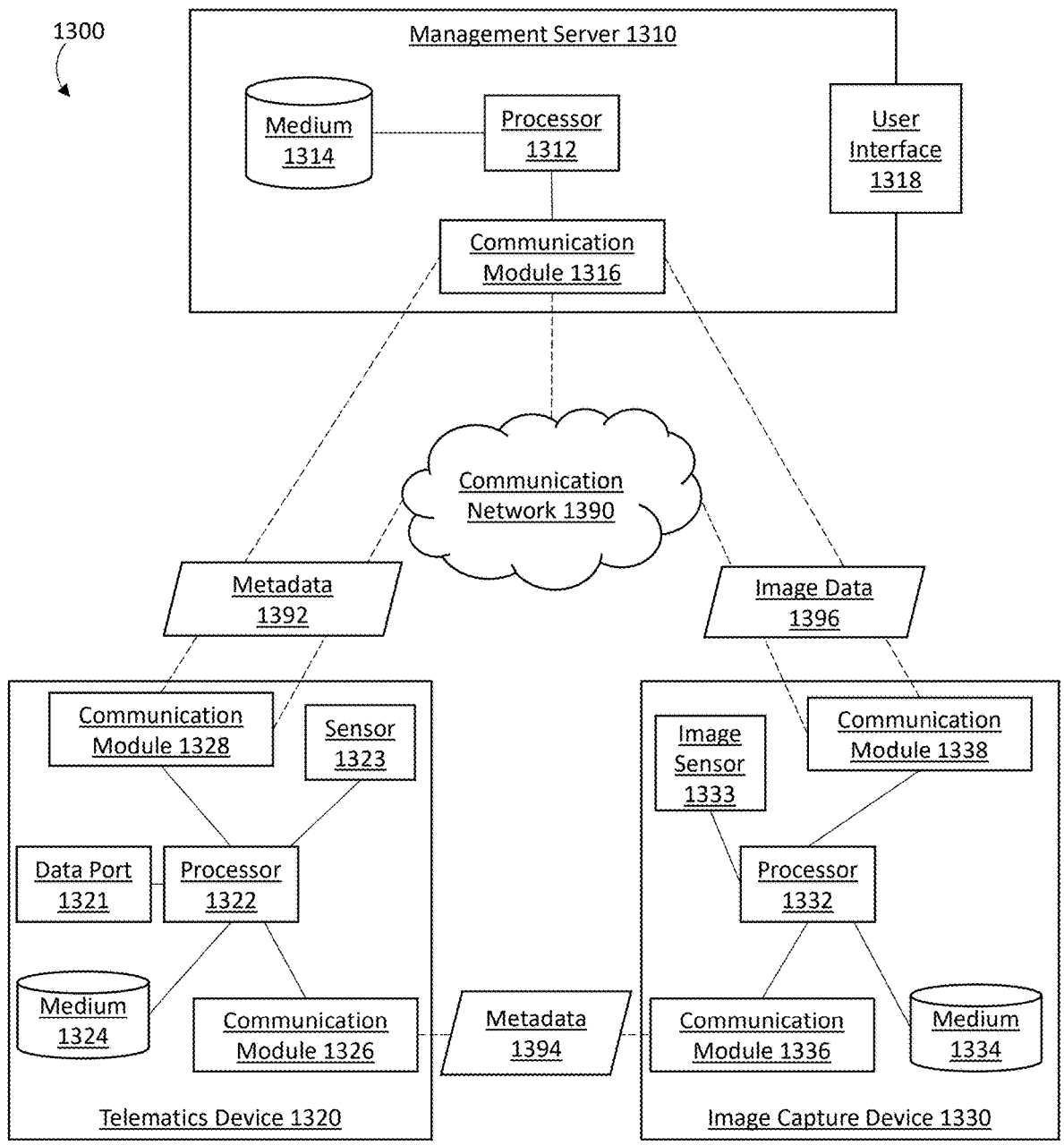
FIG. 13 is a schematic diagram of a system including a management server, telematics device, and image capture device.

FIG. 13 is a schematic diagram showing a system 1300 including exemplary hardware for the management servers, telematics devices, and peripheral devices discussed herein. The hardware shown in FIG. 13 is not exhaustive, and any appropriate additional hardware can be included in each of the devices. FIG. 13 shows an additional exemplary system 1300 which can perform method 600 in FIG. 6 or method 800 in FIG. 8.

FIG. 13 shows a management server 1310, which includes a first at least one processor 1312, a first at least one non-transitory processor-readable storage medium 1314, and a first communication module 1316. The first at least one non-transitory processor-readable storage medium 1314 can store (among other data) processor-executable instructions which, when executed by the first at least one processor 1312, control operation of the management server 1310 (e.g. cause the management server 1310 to perform any appropriate actions, such as actions in method 600 or method 800 discussed with reference to FIGS. 6 and 8).

FIG. 13 also shows a telematics device 1320, which includes a second at least one processor 1322, a second at least one non-transitory processor-readable storage medium 1324, a second communication module 1326, and a third communication module 1328. Telematics device 1320 also includes means for receiving, collecting, or capturing telematics data as described earlier. In the illustrated example in FIG. 13, telematics device 1320 includes a data port 1321, which connects to a corresponding port of a vehicle (e.g. a diagnostics port such as an OBDII port), in order to receive vehicle-related data from the vehicle. Also in the illustrated example, telematics device 1320 includes at least one sensor 1323, which captures sensor data related to the vehicle (such as location data, inertial data, or any other appropriate type of sensor data as discussed earlier). The second at least one non-transitory processor-readable storage medium 1324 can store (among other data) processor-executable instructions which, when executed by the second at least one processor 1322, control operation of the telematics device 1320 (e.g. cause the telematics device 1320 to perform any appropriate actions, such as actions in method 600 or method 800 discussed earlier with reference to FIGS. 6 and 8).

FIG. 13 also shows an image capture device 1330 which includes at least one third processor 1332, at least one image sensor 1333, at least one third non-transitory processor-readable storage medium 1334, a fourth communication module 1336, and a fifth communication module 1338. Image capture device 1330 can be any appropriate type of image capture device, such as those described earlier with reference to FIGS. 2, 3, and 4 (and may include or be communicatively coupled to a peripheral device such as in FIGS. 3 and 4). The third at least one non-transitory processor-readable storage medium 1334 can store (among other data) processor-executable instructions which, when executed by the third at least one processor 1332, control operation of the image capture device 1330 (e.g. cause the image capture device 1330 to perform any appropriate actions, such as actions in method 600 or method 800 discussed earlier with reference to FIGS. 6 and 8).

The labels "first", "second", "third", "fourth", and "fifth" are merely to label different components, and do not indicate or imply any specific sequence or ordinance of components.

The first communication module 1316, third communication module 1328, and fifth communication module 1338 are long-range communication modules, for communication between management server 1310 and telematics device 1320 and/or image capture device 1330. For example, communication modules 1316, 1328, and 1338 can be cellular modems, which enable communication of management server 1310, telematics device 1320, and image capture device 1330 over at least one cellular network. Such a cellular network is one example of communication network 1390 shown in FIG. 13, via which management server 1310 communicates with telematics device 1320 and image capture device 1330. Communication network 1390 is optional, and in some implementations management server 1310 could communicate directly with telematics device 1320 and image capture device 1330, as also shown in FIG. 13 by dashed lines. The first communication module 1316, third communication module 1328, and fifth communication module 1338 do not all have to be the same type of modules, nor is communication network 1390 limited to a single communication network. For example, communication module 1316 can be an internet capable module (e.g. an ethernet port, a wireless network module such as a WiFi™ module, or any other appropriate module) which connects to the internet; communication module 1328 can be a cellular module which connects to a cellular network of a first cellular provider; and communication module 1338 can be a cellular module which connects to a cellular network of a second cellular provider. In some implementations, communication modules 1328 and 1338 can be cellular modules which connects to a cellular network of a common cellular provider. In these implementations, each of the first communication module 1316, third communication module 1328, and fifth communication module 1338 connect to the internet and communicate over the internet, but via different mechanisms.

Second communication module 1326 and fourth communication module 1336 are generally short-range communication modules. In some implementations, second communication module 1326 and fourth communication module 1336 can be wired communication modules (such as USB ports), such that telematics device 1320 and image capture device 1330 communicate with each other over a wired connection. In other implementations, second communication module 1326 and fourth communication module 1336 are wireless communication modules, such as Bluetooth™, Zigbee™, WiFi™, or any other appropriate type of short-range wireless connection.

Long range communication modules such as cellular communication modules (e.g. communication modules 1328 and 1338) are often associated with subscription fees, and thus can be costly to have active for general use. Further, telematics data is generally smaller than image data, such that a long-range communication module in a telematics device (e.g. communication module 1328) may be low power and may not be capable of efficiently transmitting large amounts of data (such as image data). To address both of these issues, in the exemplary implementation of FIG. 13, communication module 1328 of telematics device 1320 is used for general telematics data transmission, and thus can be active often and regularly. In contrast, communication module 1338 of image capture device 1330 can be for intermittent use, only activated occasionally to transmit larger amounts of data (e.g. segments of image data). In this way, bandwidth limitations of communication module 1328 do not impact transmission of image data, and a limited cost arrangement (e.g. a pay-per-use or pay-per-MB) can be utilized for communication module 1338 to reduce subscription costs.

An exemplary implementation is discussed below where system 1300 is used to perform method 600 in FIG. 6; this discussion is intended to detail what components of system 1300 perform which steps of method 600.

In this exemplary implementation, telematics device 1320 and image capture device 1330 are positioned at vehicle 610, whereas management server 1310 is positioned at (or is) the remote device 630. Image data 690 is captured by the at least one image sensor 1333 at image capture device 1330 (as part of or for access at 611). The captured image data is stored at 613 in the at least one non-transitory processor-readable storage medium 1334 (which in this implementation corresponds to medium 601 in FIG. 6).

Metadata 692 can be captured at image capture device 1330 together with image data 690 (e.g. timestamps based on a clock at image capture device 1330), or can be captured at telematics device 1320 (e.g. by at least one sensor 1323, such as a location sensor), or can be received from the vehicle over vehicle data port 1321 (e.g. vehicle ID information). In some implementations, metadata 692 can be collected from multiple sources. For example, start time and end time metadata for image data segments can be collected from a clock at image capture device 1330, location metadata can be collected by a location sensor at telematics device 1320, and vehicle ID metadata can be collected from a vehicle via data port 1321. Accessing the metadata 692 at 612 can comprise capturing or collecting the metadata, or can comprise accessing the metadata 692 e.g. as stored in non-transitory processor-readable storage medium 1324 or 1334.

Depending on where the metadata is obtained from (image capture device 1330 and/or telematics device 1320), transmitting metadata 692 at 614 in method 600 can comprise transmitting at least a portion of metadata 692 from image capture device 1330 to telematics device 1320 via communication modules 1336 and 1326 (shown as transmission 1394 in FIG. 13). Further, transmitting metadata 692 at 614 in this example further comprises transmitting metadata 692 from telematics device 1320 by communication module 1328, for reception at management server 1310 by communication module 1316 in act 631 (shown as transmission 1392 in FIG. 13). In this way, metadata is transmitted from image capture device 1330 and/or telematics device 1320 via long-range communication hardware of the telematics device.

In this exemplary implementation, acts 632 and 633 are performed at management server 1310. For example, non-transitory processor-readable storage medium 602 can be equivalent to non-transitory processor-readable storage medium 1334 in FIG. 13, such that the metadata storage portion is stored at non-transitory processor-readable storage medium 1334, and accessed for comparison in act 633 of method 600. As another example, non-transitory processor-readable storage medium 603 can be accessible to management server 1310 (e.g. as a network storage device), where reference metadata is accessed in act 632 for comparison in act 633 of method 600. The at least one processor 1312 of management server 1310 can perform the comparison at 633.

In the exemplary implementation, act 634 is performed by communication module 1316 of management server 1310, in that indication 635 is transmitted to telematics device 1320, and subsequently to image capture device 1330 via communication modules 1326 and 1336, to prevent duplicate transmission of image data from image capture device 1330.

In the exemplary implementation, act 636 of transmitting request 693 for image data is performed by communication module 1316 of management server 1310, and act 615 of receiving request 693 is performed by communication module 1328 of telematics device 1320. Further, request 693 is subsequently transmitted to image capture device 1330 via communication modules 1326 and 1336. For act 616, the requested image data is accessed from the at least one non-transitory processor-readable storage medium 1334 of image capture device 1330. For act 617, the communication module 1338 of the image capture device 1330 transmits the requested image data 694, to be received by the communication module 1316 of management server 1310 in act 637 (shown as transmission 1396 in FIG. 13).

For act 638 of storing the requested image data, the image data can be stored in the at least on non-transitory processor-readable storage medium 1314 of management server 1310 (medium 602 in FIG. 6), or can be stored at a non-transitory processor-readable storage medium accessible to management server 1310 (medium 603 in FIG. 6).

Another exemplary implementation is discussed below where system 1300 is used to perform method 800 in FIG. 8; this discussion is intended to detail what components of system 1300 perform which steps of method 800.

In this exemplary implementation, telematics device 1320 and image capture device 1330 are positioned at vehicle 810, whereas management server 1310 is positioned at (or is) the remote device 830. Image data 690 is captured by the at least one image sensor 1333 at image capture device 1330 (as part of or for access at 611). The captured image data is stored at 613 in the at least one non-transitory processor-readable storage medium 1334 (which in this implementation corresponds to medium 601 in FIG. 8).

Metadata 692 can be captured at image capture device 1330 together with image data 690 (e.g. timestamps based on a clock at image capture device 1330), or can be captured at telematics device 1320 (e.g. by at least one sensor 1323, such as a location sensor), or can be received from the vehicle over vehicle data port 1321 (e.g. vehicle ID information). In some implementations, metadata 692 can be collected from multiple sources. For example, start time and end time metadata for image data segments can be collected from a clock at image capture device 1330, location metadata can be collected by a location sensor at telematics device 1320, and vehicle ID metadata can be collected from a vehicle via data port 1321. Accessing the metadata 692 at 612 can comprise capturing or collecting the metadata, or can comprise accessing the metadata 692 e.g. as stored in non-transitory processor-readable storage medium 1324 or 1334.

Depending on where the metadata is obtained from (image capture device 1330 and/or telematics device 1320), transmitting metadata 692 at 614 in method 800 can comprise transmitting at least a portion of metadata 692 from image capture device 1330 to telematics device 1320 via communication modules 1336 and 1326 (shown as transmission 1394 in FIG. 13). Further, transmitting metadata 692 at 614 in this example further comprises transmitting metadata 692 from telematics device 1320 by communication module 1328, for reception at management server 1310 by communication module 1316 in act 832 (shown as transmission 1392 in FIG. 13). In this way, metadata is transmitted from image capture device 1330 and/or telematics device 1320 via long-range communication hardware of the telematics device 1320.

In this exemplary implementation, in act 832 a user request 831 for image data is received, for example by a user interface 1318 of management server 1310 or by client device which communicates with management server 1310. In the illustrated example, User interface 1318 is shown at a border of management server 1310, to illustrate that user interface 1318 can be either included in, or separate from, management server 1310. As an example, management server 1310 could include input devices 524 as shown in FIG. 5, for a user to provide input to management server 1310. As another example, system 500 in FIG. 5 can be an additional device which connects to management server 1310; in this example a user provides input to system 500, which in turn provides the user input to management server 1310.

Further in this exemplary implementation, acts 833 and 834 are performed at management server 1310. For example, non-transitory processor-readable storage medium 802 can be equivalent to non-transitory processor-readable storage medium 1334 in FIG. 13, such that the metadata storage portion is stored at non-transitory processor-readable storage medium 1334, and accessed for comparison in act 834 of method 800. As another example, a non-transitory processor-readable storage medium can be accessible to management server 1310 (e.g. as a network storage device), where reference metadata is accessed in act 833 for comparison in act 834 of method 800. The at least one processor 1312 of management server 1310 can perform the comparison at 834.

In some cases, act 835 is performed by communication module 1316 of management server 1310, in that select image data 891 is transmitted to a user interface separate from management server 1310. In other cases, act 835 is performed by a user interface of management server 1310 (e.g. where user interface 1318 is included in management server 1310).

In the exemplary implementation, act 837 of transmitting request 892 for select image data is performed by communication module 1316 of management server 1310, and act 811 of receiving request 892 is performed by communication module 1328 of telematics device 1320. Further, request 892 is subsequently transmitted to image capture device 1330 via communication modules 1326 and 1336. For act 812, the requested image data is accessed from the at least one non-transitory processor-readable storage medium 1334 of image capture device 1330. For act 813, the communication module 1338 of the image capture device 1330 transmits the requested image data 893, to be received by the communication module 1316 of management server 1310 in act 838 (shown as transmission 1396 in FIG. 13).

For act 839 of storing the requested image data, the image data can be stored in the at least one non-transitory processor-readable storage medium 1314 of management server 1310 (medium 802 in FIG. 6), or can be stored at a non-transitory processor-readable storage medium accessible to management server 1310.

The requested image data 893 can then be presented by a user interface per act 851 of method 800. In some cases, image data 893 is presented by user interface 1318 as included in management server 1310 (e.g. via a display such as display 522 in FIG. 5). In other cases, the requested image data 893 is first transmitted to a user interface separate from the management server 1310; such user interface receives the requested image data 893 at 851 and presents the same at 852.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device (e.g. vehicle device 122 or telematics subsystem 102) generally refers to the data information being stored at a non-transitory processor-readable storage medium of said device (e.g. non-transitory processor-readable storage mediums 116 or 126).

What is claimed is:

1. A method comprising:
   storing, by a first at least one non-transitory processor-readable storage medium onboard a vehicle, a plurality of image data segments captured by at least one image capture device onboard the vehicle, each image data segment of the plurality of image data segments having a respective start time and a respective end time;
   transmitting, by at least one communication interface onboard the vehicle, a plurality of metadata segments associated with the plurality of image data segments, each metadata segment of the plurality of metadata segments indicating at least the respective start time and the respective end time of a corresponding image data segment of the plurality of image data segments;
   receiving, by a communication interface of a remote device separate from the vehicle, the plurality of metadata segments;
   accessing a library of reference metadata segments stored in a reference metadata storage portion of a second at least one non-transitory processor-readable storage medium of the remote device, each reference metadata segment in the library of reference metadata segments indicating at least a respective start time and a respective end time of a corresponding image data segment of a library of image data segments stored in an image data storage portion of the second at least one non-transitory processor-readable storage medium;
   determining, by at least one processor of the remote device for each metadata segment of the plurality of metadata segments, whether metadata criteria are satisfied, the metadata criteria comprising: the respective start time and end time indicated in the metadata segment of the plurality of metadata segments matching a start time and end time of a reference metadata segment of the library of reference metadata segments stored in the reference metadata storage portion;
   for each metadata segment of the plurality of metadata segments for which the metadata criteria are satisfied: outputting an indication that a corresponding image data segment is stored in the image data storage portion; and
   for each metadata segment of the plurality of metadata segments for which the metadata criteria are not satisfied:
      transmitting, by the communication interface of the remote device to be received by the at least one communication interface onboard the vehicle, at least one request for each image data segment of the plurality of image data segments corresponding to each metadata segment for which the metadata criteria are not satisfied;
      transmitting, by the at least one communication interface onboard the vehicle to be received by the communication interface of the remote device, each image data segment of the plurality of image data segments indicated in the at least one request;
      storing, by the second at least one non-transitory processor-readable storage medium in the image data storage portion, each image data segment received by the communication interface of the remote device; and storing, by the second at least one non-transitory processor-readable storage medium in the reference metadata storage portion, each metadata segment of the plurality of metadata segments corresponding to each image data segment received by the communication interface of the remote device.

2. The method of claim 1, further comprising:

capturing, by the at least one image capture device onboard the vehicle, the plurality of image data segments; and generating the plurality of metadata segments associated with the plurality of image data segments.

3. The method of claim 2, wherein transmitting the plurality of metadata segments is performed in response to generating the plurality of metadata segments.

4. The method of claim 1, wherein transmitting the plurality of metadata segments is performed in according with a schedule.

5. The method of claim 1, wherein:

the at least one communication interface onboard the vehicle comprises a communication interface included in the image capture device onboard the vehicle;

transmitting the plurality of metadata segments comprises transmitting, by the communication interface of the image capture device, the plurality of metadata segments;

transmitting the at least one request for each image data segment of the plurality of image data segments corresponding to each metadata segment for which the metadata criteria are not satisfied comprises transmitting, by the communication interface of the remote device to be received by the communication interface included in the image capture device, the at least one request; and transmitting each image data segment of the plurality of image data segments indicated in the at least one request comprises transmitting each image data segment of the plurality of image data segments indicated in the at least one request by the communication interface of the image capture device.

6. The method of claim 1, wherein:

the communication interface of the remote device includes a first communication interface;

the at least one communication interface onboard the vehicle includes:

a second communication interface included in a peripheral device onboard the vehicle;

a third communication interface included in the peripheral device;

a fourth communication interface included in the image capture device onboard the vehicle; and a fifth communication interface included in the image capture device;

transmitting the at least one request for each image data segment of the plurality of image data segments corresponding to each metadata segment for which the metadata criteria are not satisfied comprises:

transmitting the request by the first communication interface, to be received by the third communication interface; and transmitting the request by the second communication interface to be received by the fourth communication interface; and transmitting each image data segment of the plurality of image data segments indicated in the at least one request comprises:

transmitting each image data segment of the plurality of image data segments indicated in the at least one request by the fifth communication interface to be received by the first communication interface.

7. The method of claim 6, wherein transmitting the plurality of metadata segments associated with the plurality of image data segments comprises:

transmitting the plurality of metadata segments associated with the plurality of image data segments by the fourth communication interface of the image capture device to be received by the second communication interface of the peripheral device; and transmitting the plurality of metadata segments associated with the plurality of image data segments by the third communication interface of the peripheral device.

8. The method of claim 1, wherein:

each metadata segment of the plurality of metadata segments further indicates a respective location associated with a corresponding image data segment of the plurality of image data segments;

the reference metadata storage portion further stores respective location metadata associated with image data stored in the image data storage portion; and the metadata criteria further comprises the respective location indicated in the respective metadata segment of the plurality of metadata segments matching respective location metadata stored in the reference metadata storage portion.

9. The method of claim 1, wherein:

the first at least one non-transitory processor-readable storage medium is included in the image capture device onboard the vehicle; and storing, by the first at least one non-transitory processor-readable storage medium, the plurality of image data segments comprises storing the plurality of image data segments by the first at least one non-transitory processor-readable storage medium of the image capture device.

10. The method of claim 1, further comprising:

receiving, by a user input interface of the remote device, a user input requesting at least one select image data segment, each select image data segment having an associated start time and an associated end time;

for each select image data segment where the associated start time and the associated end time match a paired start time and end time in the metadata storage portion, output the select image data segment as stored in the image data storage portion; and for each select image data segment where the associated start time and the associated end time do not match a paired start time and end time in the metadata storage portion:

transmitting, by the communication interface of the remote device for reception by the at least one communication interface onboard the vehicle, a request for the select image data segment;

transmitting, by the at least one communication interface onboard the vehicle for reception by the communication interface of the remote device, the select image data segment in response to the request for the select image data segment; and store the select image data segment as received by the remote device.

11. A system comprising:
at least one vehicle device for use onboard a vehicle, the at least one vehicle device including at least one communication interface, a first at least one processor, and a first at least one non-transitory processor-readable storage medium storing first processor-executable instructions which, when executed by the first at least one processor cause the vehicle device to:
- store, by the first at least one non-transitory processor-readable storage medium, a plurality of image data segments captured by an image capture device onboard the vehicle, each image data segment of the plurality of image data segments having a respective start time and a respective end time; and
- transmit, by the at least one communication interface at the vehicle, a plurality of metadata segments associated with the plurality of image data segments, each metadata segment of the plurality of metadata segments indicating at least the respective start time and the respective end time of a corresponding image data segment of the plurality of image data segments; and a remote device separate from the vehicle, the remote device including at least one communication interface, a second at least one processor, and a second at least one non-transitory processor-readable storage medium storing second processor-executable instructions which, when executed by the second at least one processor cause the remote device to:
- receive, by the communication interface of the remote device, the plurality of metadata segments;
- accessing a library of reference metadata segments stored in a reference metadata storage portion of the second at least one non-transitory processor-readable storage medium, each reference metadata segment in the library of reference metadata segments indicating at least a respective start time and a respective end time of a corresponding image data segment of a library of image data segments stored in an image data storage portion of the second at least one non-transitory processor-readable storage medium;
- determining, by the second at least one processor for each metadata segment of the plurality of metadata segments, whether metadata criteria are satisfied, the metadata criteria comprising: the respective start time and end time indicated in the metadata segment of the plurality of metadata segments matching a start time and end time of a reference metadata segment of the library of reference metadata segments stored in the reference metadata storage portion;
- for each metadata segment of the plurality of metadata segments for which the metadata criteria are satisfied: output an indication that a corresponding image data segment is stored in the image data storage portion; and
- for each metadata segment of the plurality of metadata segments for which the metadata criteria are not satisfied: transmit, by the communication interface of the remote device to be received by the at least one communication interface at onboard the vehicle, at least one request for each image data segment of the plurality of image data segments corresponding to each metadata segment for which the metadata criteria are not satisfied, wherein:
the first processor-executable instructions further cause the at least one vehicle device to: transmit, by the at least one communication interface at the vehicle, each image data segment of the plurality of image data segments indicated in the at least one request;
the second processor-executable instructions further cause the remote device to:
- receive by the communication interface of the remote device, each image data segment of the plurality of image data segments indicated in the at least one request;
- store, by the second at least one non-transitory processor-readable storage medium in the image data storage portion, each image data segment received in response to the at least one request; and
- store, by the second at least one non-transitory processor-readable storage medium in the reference metadata storage portion, each metadata segment of the plurality of metadata segments corresponding to each image data segment received in response to the at least one request.

12. The system of claim 11, wherein:
the at least one vehicle device comprises the image capture device;
the first processor-executable instructions cause the at least one image capture device to capture the plurality of image data segments; and
the first processor-executable instructions cause the at least one image capture device to generate the plurality of metadata segments associated with the plurality of image data segments.

13. The system of claim 12, wherein the first processor-executable instructions cause the at least one vehicle device to transmit the plurality of metadata segments in response to generation of the plurality of metadata segments.

14. The system of claim 11, wherein the first processor-executable instructions which cause the at least one vehicle device to transmit the plurality of metadata segments cause the at least one vehicle device to transmit the plurality of metadata segments according with a schedule.

15. The system of claim 11, wherein:
the at least one vehicle device comprises the image capture device;
the at least one communication interface at the vehicle comprises a communication interface included in the image capture device;
the first processor-executable instructions which cause the vehicle device to transmit the plurality of metadata segments cause the image capture device to transmit, by the communication interface of the image capture device, the plurality of metadata segments;
the second processor-executable instructions which cause the remote device to transmit the at least one request for each image data segment of the plurality of image data segments corresponding to each metadata segment for which the metadata criteria are not satisfied cause the remote device to transmit, by the communication interface of the remote device to be received by the communication interface included in the image capture device, the request; and
the first processor-executable instructions which cause the at least one vehicle device to transmit each image data segment of the plurality of image data segments indicated in the at least one request cause the image capture device to transmit each image data segment of the plurality of image data segments indicated in the at least one request by the communication interface of the image capture device.

16. The system of claim 11, wherein:
the communication interface of the remote device comprises a first communication interface;
the at least one vehicle device comprises the image capture device and a peripheral device;
the at least one communication interface of the vehicle device comprises:
a second communication interface included in the peripheral device;
a third communication interface included in the peripheral device;
a fourth communication interface included in the image capture device; and
a fifth communication interface included in the image capture device;
the second processor-executable instructions which cause the at least one vehicle device to transmit the at least one request for each image data segment of the plurality of image data segments corresponding to each metadata segment for which the metadata criteria are not satisfied cause the remote device to: transmit the request by the first communication interface, to be received by the third communication interface of the peripheral device;
the first processor-executable instructions further cause the peripheral device to transmit the request by the second communication interface, to be received by the fourth communication interface of the image capture device; and
the first processor-executable instructions which cause the at least one vehicle device to transmit each image data segment of the plurality of image data segments indicated in the at least one request cause the image capture device to: transmit each image data segment of the plurality of image data segments indicated in the at least one request by the fifth communication interface to be received by the first communication interface of the remote device.

17. The system of claim 16, wherein the first processor-executable instructions which cause the at least one vehicle device to transmit the plurality of metadata segments associated with the plurality of image data segments cause the at least one vehicle device to:
transmit the plurality of metadata segments associated with the plurality of image data segments by the fourth communication interface of the image capture device to be received by the second communication interface of the peripheral device; and
transmit the plurality of metadata segments associated with the plurality of image data segments by the third communication interface of the peripheral device to be received by the first communication interface of the remote device.

18. The system of claim 11, wherein:
each metadata segment of the plurality of metadata segments further indicates a respective location associated with a corresponding image data segment of the plurality of image data segments;
the reference metadata storage portion further stores respective location metadata associated with image data stored in the image data storage portion; and
the metadata criteria further comprises the respective location indicated in the respective metadata segment of the plurality of metadata segments matching respective location metadata stored in the reference metadata storage portion.

19. The system of claim 11, wherein:
the at least one vehicle device comprises the image capture device; and
the first at least one non-transitory processor-readable storage medium is included in the image capture device onboard the vehicle.

20. The system of claim 11, further comprising:
a user input interface at the remote device;
wherein the second processor-executable instructions further cause the remote device to:
receive, by the user input interface of the remote device, a user input requesting at least one select image data segment, each select image data segment having an associated start time and an associated end time;
for each select image data segment where the associated start time and the associated end time match a paired start time and end time in the metadata storage portion, output the select image data segment as stored in the image data storage portion; and
for each select image data segment where the associated start time and the associated end time do not match a paired start time and end time in the metadata storage portion: transmit, by the communication interface of the remote device, a request for the select image data segment; and
wherein the first processor-executable instructions further cause the at least one vehicle device to:
receive, by the at least one communication interface of the at least one vehicle device, the request for the select image data segment; and
transmit, by the at least one communication interface of the at least one vehicle device for reception at by the communication interface of the remote device, the select image data segment in response to the request for the select image data segment; and
wherein the second processor-executable instructions further cause the remote device to:
receive, by the communication interface of the remote device, the select image data segment; and
store the select image data segment in the image data storage portion.

* * * * *